(12) United States Patent
Richter

(10) Patent No.: US 12,293,759 B2
(45) Date of Patent: May 6, 2025

(54) METHOD AND DEVICE FOR PRESENTING A CGR ENVIRONMENT BASED ON AUDIO DATA AND LYRIC DATA

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/385,540

(22) Filed: Oct. 31, 2023

(65) Prior Publication Data
US 2024/0071377 A1    Feb. 29, 2024

Related U.S. Application Data

(63) Continuation of application No. 16/867,947, filed on May 6, 2020, now Pat. No. 11,842,729.

(60) Provisional application No. 62/844,867, filed on May 8, 2019.

(51) Int. Cl.
| | |
|---|---|
| G10L 13/00 | (2006.01) |
| G06F 3/01 | (2006.01) |
| G06F 16/683 | (2019.01) |
| G06N 20/00 | (2019.01) |
| G10L 15/18 | (2013.01) |
| G10L 21/10 | (2013.01) |
| G10L 25/63 | (2013.01) |

(52) U.S. Cl.
CPC .......... G10L 15/1815 (2013.01); G06F 3/011 (2013.01); G06F 16/685 (2019.01); G06N 20/00 (2019.01); G10L 21/10 (2013.01); G10L 25/63 (2013.01)

(58) Field of Classification Search
None
See application file for complete search history.

(56) References Cited

U.S. PATENT DOCUMENTS

| | | |
|---|---|---|
| 6,271,854 B1 | 8/2001 | Light |
| 6,738,067 B2 | 5/2004 | Hayama et al. |
| 6,842,175 B1 | 1/2005 | Schmalstieg et al. |
| 9,141,867 B1 * | 9/2015 | Matsuzuka ........... G06F 40/205 |
| 9,367,608 B1 | 6/2016 | Zhang |
| 9,880,805 B1 * | 1/2018 | Guralnick ............. G06F 3/0482 |
| 9,967,457 B1 * | 5/2018 | Matias .................. G11B 27/10 |
| 9,973,792 B1 * | 5/2018 | Delachanal ......... H04L 65/1089 |

(Continued)

*Primary Examiner* — Jakieda R Jackson
(74) *Attorney, Agent, or Firm* — Fernando & Partners, LLP

(57) ABSTRACT

In one implementation, a method of generating CGR content to accompany an audio file including audio data and lyric data based on semantic analysis of the audio data and the lyric data is performed by a device including a processor, non-transitory memory, a speaker, and a display. The method includes obtaining an audio file including audio data and lyric data associated with the audio data. The method includes performing natural language analysis of at least a portion of the lyric data to determine a plurality of candidate meanings of the portion of the lyric data. The method includes performing semantic analysis of the portion of the lyric data to determine a meaning of the portion of the lyric data by selecting, based on a corresponding portion of the audio data, one of the plurality of candidate meanings as the meaning of the portion of the lyric data. The method includes generating CGR content associated with the portion of the lyric data based on the meaning of the portion of the lyric data.

27 Claims, 18 Drawing Sheets

(56) References Cited

U.S. PATENT DOCUMENTS

| | | |
|---|---|---|
| 10,074,381 B1 | 9/2018 | Cowburn et al. |
| 10,127,733 B2 | 11/2018 | Soon-Shiong |
| 10,242,501 B1 | 3/2019 | Pusch et al. |
| 10,276,170 B2* | 4/2019 | Gruber .................... G06F 3/167 |
| 10,310,073 B1 | 6/2019 | Santra et al. |
| 10,446,126 B1* | 10/2019 | Kaye ........................ G10H 1/20 |
| 10,455,297 B1* | 10/2019 | Mahyar .............. H04N 21/4532 |
| 10,587,594 B1 | 3/2020 | McClintock et al. |
| 10,621,779 B1 | 4/2020 | Topiwala et al. |
| 11,671,675 B2* | 6/2023 | Sun ................... H04N 21/8545 |
| | | 725/32 |
| 2005/0108646 A1 | 5/2005 | Willins et al. |
| 2005/0216458 A1 | 9/2005 | Morris et al. |
| 2007/0094224 A1 | 4/2007 | Au |
| 2008/0184870 A1 | 8/2008 | Toivola |
| 2008/0297587 A1 | 12/2008 | Kurtz et al. |
| 2009/0058860 A1 | 3/2009 | Fong et al. |
| 2009/0265213 A1 | 10/2009 | Hyman et al. |
| 2009/0300525 A1 | 12/2009 | Jolliff et al. |
| 2010/0018382 A1 | 1/2010 | Feeney et al. |
| 2010/0174526 A1 | 7/2010 | Zhang |
| 2010/0199295 A1* | 8/2010 | Katpelly .................. G06N 5/04 |
| | | 725/46 |
| 2010/0250237 A1 | 9/2010 | Weng et al. |
| 2011/0213655 A1 | 9/2011 | Henkin et al. |
| 2011/0273455 A1 | 11/2011 | Powar et al. |
| 2011/0289094 A1* | 11/2011 | Fisher ................ G06F 16/3323 |
| | | 707/E17.104 |
| 2012/0323559 A1 | 12/2012 | Ikeda et al. |
| 2013/0120224 A1 | 5/2013 | Cajigas et al. |
| 2013/0197902 A1 | 8/2013 | Nazarian |
| 2013/0218961 A1 | 8/2013 | Ho |
| 2014/0195918 A1 | 7/2014 | Friedlander |
| 2015/0052102 A1* | 2/2015 | Nihal ............... H04N 21/26603 |
| | | 707/610 |
| 2015/0081066 A1* | 3/2015 | Yeh ........................ G01C 21/20 |
| | | 700/94 |
| 2015/0113412 A1 | 4/2015 | Peyton et al. |
| 2015/0193970 A1 | 7/2015 | Liu et al. |
| 2016/0140958 A1 | 5/2016 | Heo et al. |
| 2016/0162478 A1* | 6/2016 | Blassin .......... G06Q 10/063112 |
| | | 706/12 |
| 2016/0255396 A1* | 9/2016 | Des Jardins ........ H04N 21/812 |
| | | 725/32 |
| 2016/0301817 A1 | 10/2016 | Sasaki |
| 2017/0123750 A1 | 5/2017 | Todasco |
| 2017/0140745 A1* | 5/2017 | Nayak ................. H04L 65/1089 |
| 2017/0195398 A1 | 7/2017 | Sharma et al. |
| 2017/0200081 A1 | 7/2017 | Allen et al. |
| 2017/0238055 A1 | 8/2017 | Chang et al. |
| 2017/0270142 A1 | 9/2017 | Shioya et al. |
| 2017/0357661 A1 | 12/2017 | Hornkvist et al. |
| 2018/0020285 A1 | 1/2018 | Zass |
| 2018/0060304 A1 | 3/2018 | Bull et al. |
| 2018/0101780 A1 | 4/2018 | Allen et al. |
| 2018/0143975 A1* | 5/2018 | Casal ...................... G06F 40/51 |
| 2018/0198885 A1* | 7/2018 | Dakhane ............... H04L 65/765 |
| 2018/0286129 A1 | 10/2018 | Harviainen |
| 2018/0293798 A1 | 10/2018 | Energin et al. |
| 2018/0356964 A1 | 12/2018 | Morris |
| 2018/0374461 A1 | 12/2018 | Serletic et al. |
| 2019/0041988 A1 | 2/2019 | Pohl et al. |
| 2019/0043239 A1 | 2/2019 | Goel et al. |
| 2019/0147841 A1 | 5/2019 | Zatepyakin et al. |
| 2019/0178980 A1 | 6/2019 | Zhang et al. |
| 2019/0193273 A1 | 6/2019 | Favis et al. |
| 2019/0196576 A1 | 6/2019 | Saarinen et al. |
| 2019/0206102 A1 | 7/2019 | Dalonzo |
| 2020/0314508 A1 | 10/2020 | Waterman |
| 2021/0019371 A1 | 1/2021 | Saha et al. |
| 2021/0191506 A1 | 6/2021 | Wang et al. |

* cited by examiner

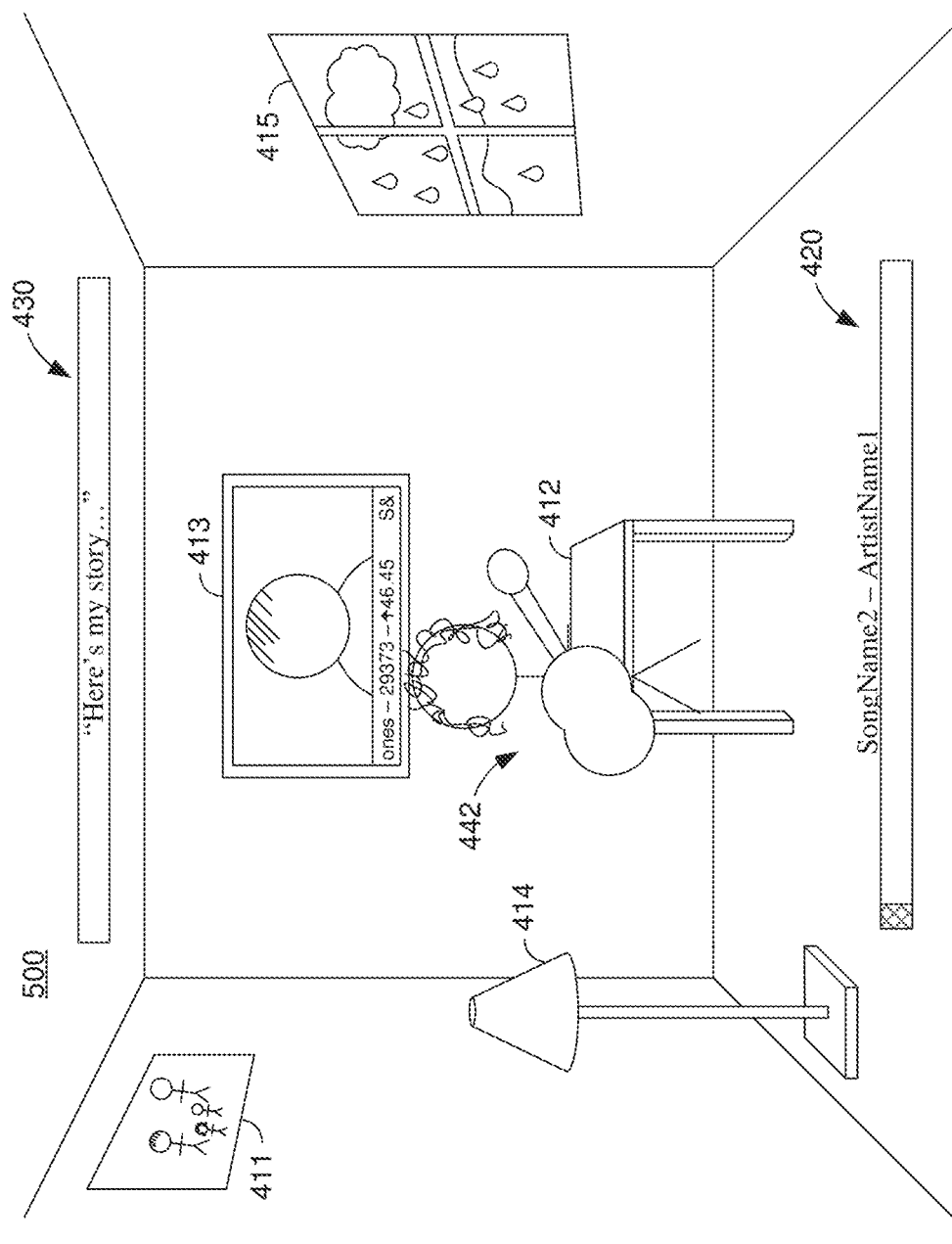

METHOD AND DEVICE FOR PRESENTING A CGR ENVIRONMENT BASED ON AUDIO DATA AND LYRIC DATA

CROSS-REFERENCE TO RELATED APPLICATIONS

This application is a continuation of U.S. Non-Provisional patent application Ser. No. 16/867,947, filed on May 6, 2020, which claims priority to U.S. Provisional Patent App. No. 62/844,867, filed on May 8, 2019, which are hereby incorporated by reference in their entireties.

TECHNICAL FIELD

The present disclosure generally relates to computer-generated reality environments and, in particular, to systems, methods, and devices for presenting a computer-generated reality environment based on one or more audio files.

BACKGROUND

As described herein, in order to provide immersive media experiences to a user, computing devices present computer-generated reality (CGR) that intertwines computer-generated media content (e.g., including images, video, audio, smells, haptics, etc.) with real-world stimuli to varying degrees—ranging from wholly synthetic experiences to barely perceptible computer-generated media content superimposed on real-world stimuli. To these ends, in accordance with various implementations described herein, CGR systems, methods, and devices include mixed reality (MR) and virtual reality (VR) systems, methods, and devices. Further, MR systems, methods, and devices include augmented reality (AR) systems in which computer-generated content is superimposed (e.g., via a transparent display) upon the field-of-view of the user and composited reality (CR) systems in which computer-generated content is composited or merged with an image of the real-world environment. While the present description provides delineations between AR, CR, MR, and VR for the mere sake of clarity, those of ordinary skill in the art will appreciate from the present disclosure that such delineations are neither absolute nor limiting with respect to the implementation of any particular CGR system, method, and/or device. Thus, in various implementations, a CGR environment include elements from a suitable combination of AR, CR, MR, and VR in order to produce any number of desired immersive media experiences.

In various implementations, a user is present in a CGR environment, either physically or represented by an avatar (which may be virtual or real, e.g., a drone or robotic avatar). In various implementations, the avatar simulates some or all of the physical movements of the user.

A CGR environment based on VR may be wholly immersive to the extent that real-world sensory inputs of particular senses of the user (e.g., vision and/or hearing) are completely replaced with computer-generated sensory inputs. Accordingly, the user is unable to see and/or hear his/her real-world surroundings. CGR environments based on VR can utilize (spatial) audio, haptics, etc. in addition to computer-generated images to enhance the realism of the experience. Thus, in various implementations, real-world information of particular senses provided to the user is limited to depth, shape, orientation, and/or layout information; and such real-world information is passed indirectly to the user. For example, the walls of real-world room are completely skinned with digital content so that the user cannot see the real-world walls as they exist in reality.

A CGR environment based on mixed reality (MR) includes, in addition to computer-generated media content, real-world stimuli received by a user either directly, as in the case of a CGR environment based on augmented reality (AR), or indirectly, as in the case of a CGR environment based on composited reality (CR).

A CGR environment based on augmented reality (AR) includes real-world optical passthrough such that real-world light enters a user's eyes. For example, in an AR system a user is able to see the real world through a transparent surface, and computer-generated media content (e.g., images and/or video) is projected onto that surface. In particular implementations, the media content is projected onto the surface to give the visual impression that the computer-generated media content is a part of and/or anchored to the real-world. Additionally or alternatively, the computer-generated image data may be projected directly towards a user's eyes so that real-world light and the projected light of the computer-generated media content concurrently arrive on a user's retinas.

A CGR environment based on composited reality (CR) includes obtaining real-world stimulus data obtained from an appropriate sensor and compositing the real-world stimulus data with computer-generated media content (e.g., merging the stimulus data with the computer-generated content, superimposing the computer-generated content over portions of the stimulus data, or otherwise altering the real-world stimulus data before presenting it to the user) to generated composited data. The composited data is then provided to the user, and thus the user receives the real-world stimulus indirectly, if at all. For example, for visual portions of a GGR environment based on CR, real-world image data is obtained using an image sensor, and the composited image data is provided via a display.

While music is typically an audio experience, the lyrical content, sound dynamics, or other features lend themselves to a supplemental visual experience. Previously available audiovisual experiences, such as music videos and/or algorithmic audio visualizations, are not truly immersive and/or are not tailored to a user environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5C illustrate a second CGR environment with CGR content generated based on natural language analysis and semantic analysis of a second audio file in accordance with some implementations.

Figure 1A:
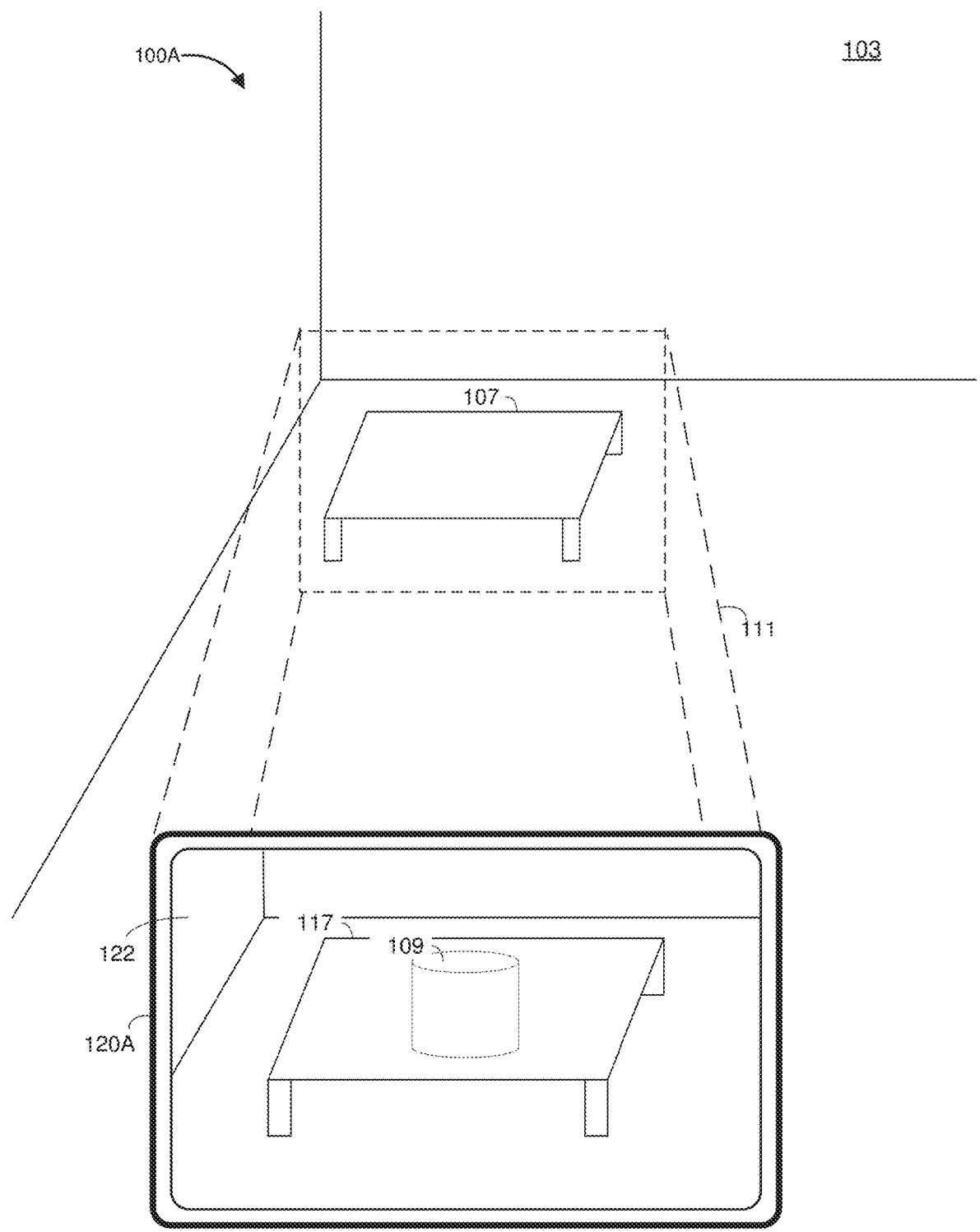
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating CGR content to accompany an audio file including audio data and lyric data based on semantic analysis of the audio data and the lyric data. In various implementations, a method is performed by a device including a processor, non-transitory memory, a speaker, and a display. The method includes obtaining an audio file including audio data and lyric data associated with the audio data. The method includes performing natural language analysis of at least a portion of the lyric data to determine a plurality of candidate meanings of the portion of the lyric data. The method includes performing semantic analysis of the portion of the lyric data to determine a meaning of the portion of the lyric data by selecting, based on a corresponding portion of the audio data, one of the plurality of candidate meanings as the meaning of the portion of the lyric data. The method includes generating CGR content associated with the portion of the lyric data based on the meaning of the portion of the lyric data.

Various implementations disclosed herein include devices, systems, and methods for generating CGR content to accompany a mashup of two audio files in accordance with some implementations. In various implementations, a method is performed by a device including a processor, non-transitory memory, a speaker, and a display. The method includes obtaining a first audio file and a second audio file. The method includes parsing the first audio file into a plurality of first segments and parsing the second audio file into a plurality of second segments. The method includes generating, for each of the plurality of first segments and each of the plurality of second segments, segment metadata. The method includes determining a relationship between first segment metadata of one of the plurality of first segments and second segment metadata of one of the plurality of second segments. The method includes generating CGR content associated with the one of the plurality of first segments and the one of the plurality of second segments based on the relationship, the first segment metadata, and the second segment metadata.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, previously available audiovisual experiences, such as music videos and/or algorithmic audio visualizations, are not truly immersive and/or are not tailored to a user environment. Because language is inherently ambiguous, generating CGR content to accompany a song based on the lyrics of a song may lead to nonintuitive presentation that detracts from rather than adds to immersion in the CGR environment.

Accordingly, in various implementations described herein, CGR content to accompany a song is based on both natural language analysis of the lyrics of the song and semantic analysis that determines a meaning of the lyrics based on the audio, e.g., a key, tempo, rhythm, mood, or vocal timbre. Further, in various implementations, two segments or two songs are played concurrently and CGR content is generated based on a relationship between the two segments, e.g., a semantic relationship between the meaning of the lyrics of the segments.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120A.

In some implementations, the electronic device 120A is configured to present a CGR experience to a user. In some implementations, the electronic device 120A includes a suitable combination of software, firmware, and/or hardware. According to some implementations, the electronic device 120A presents, via a display 122, a CGR experience to the user while the user is physically present within a physical environment 103 that includes a table 107 within the field-of-view 111 of the electronic device 120A. As such, in some implementations, the user holds the electronic device 120A in his/her hand(s). In some implementations, while presenting an augmented reality (AR) experience, the electronic device 120A is configured to present AR content (e.g., an AR cylinder 109) and to enable video pass-through of the physical environment 103 (e.g., including a representation of the table 107) on a display 122.

Figure 1B:
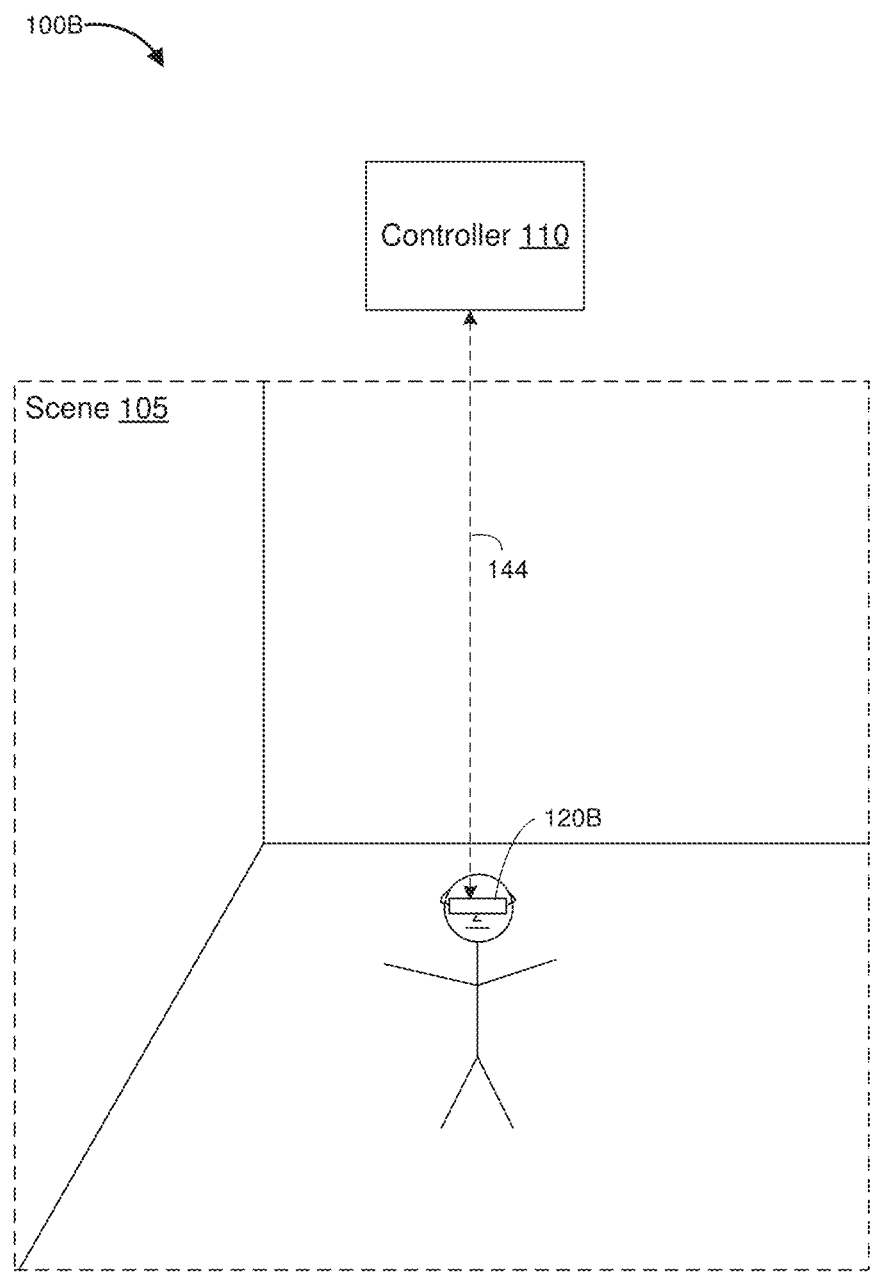
FIG. 1B is a block diagram of an example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes a controller 110 and a head-mounted device (HMD) 120B.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120B via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120B.

In some implementations, the HMD 120B is configured to provide the CGR experience to the user. In some implementations, the HMD 120B includes a suitable combination of software, firmware, and/or hardware. The HMD 120B is described in greater detail below with respect to FIG. 3. In some implementations, the functionalities of the controller 110 are provided by and/or combined with the HMD 120B.

According to some implementations, the HMD 120B provides a CGR experience to the user while the user is virtually and/or physically present within the scene 105.

In some implementations, the user wears the HMD 120B on his/her head. As such, the HMD 120B includes one or more CGR displays provided to display the CGR content. For example, in various implementations, the HMD 120B encloses the field-of-view of the user. In some implementations, the HMD 120B is replaced with a handheld device (such as a smartphone or tablet) configured to present CGR content, and rather than wearing the HMD 120B the user holds the device with a display directed towards the field-of-view of the user and a camera directed towards the scene 105. In some implementations, the handheld device can be placed within an enclosure that can be worn on the head of the user. In some implementations, the HMD 120B is replaced with a CGR chamber, enclosure, or room configured to present CGR content in which the user does not wear or hold the HMD 120B.

Figure 2:
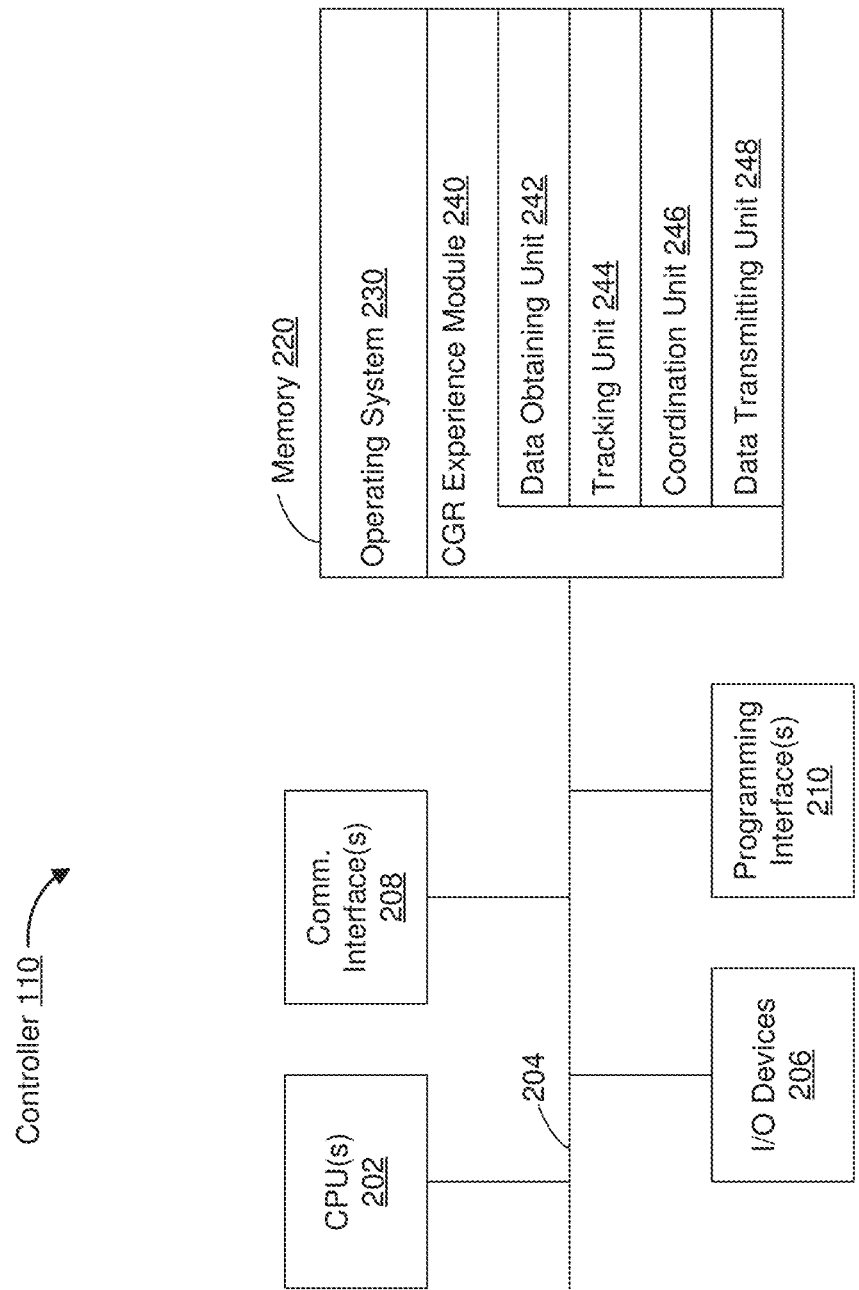
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120B of FIG. 1B. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120B with respect to the scene 105 of FIG. 1B. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120B. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120B. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
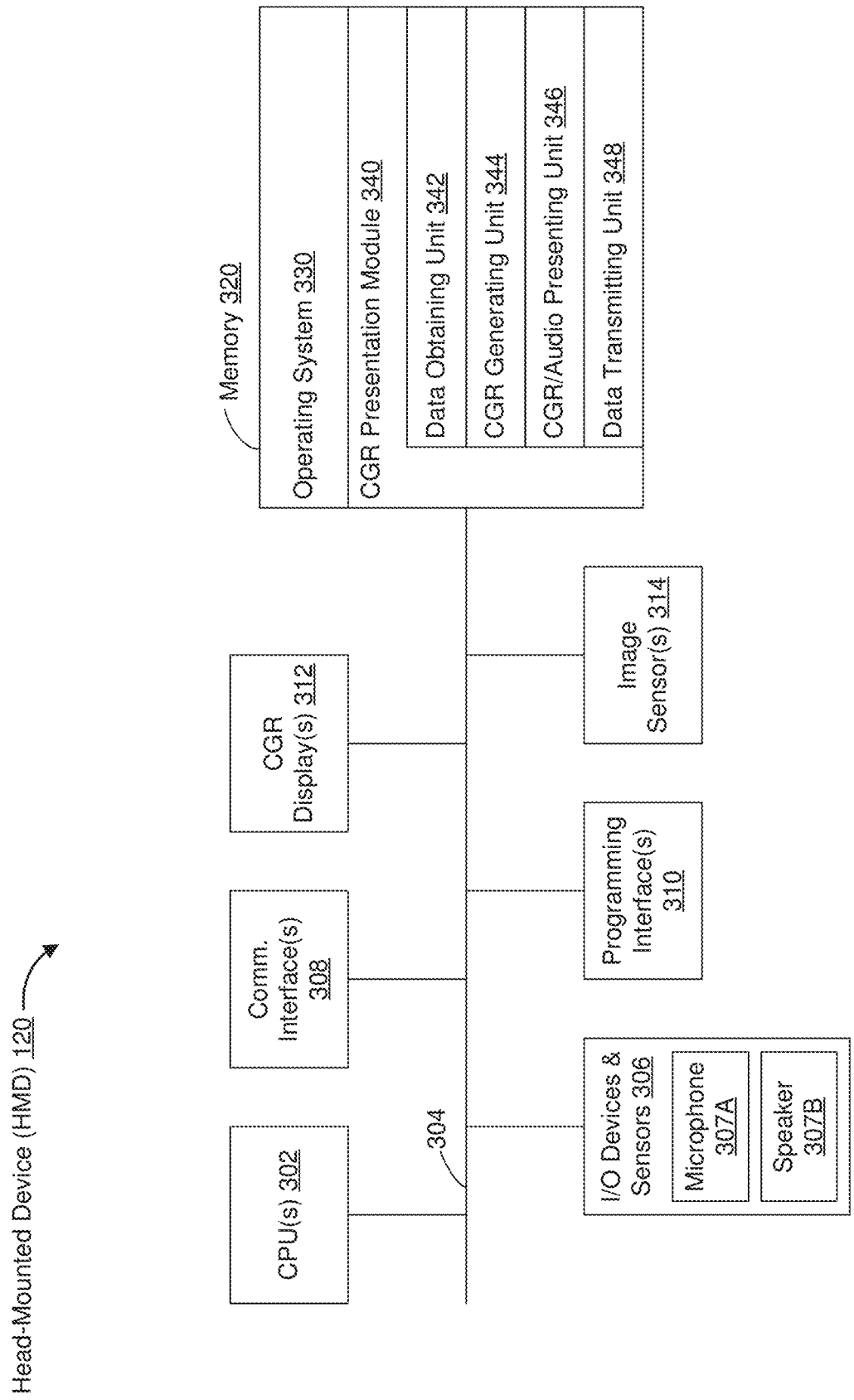
FIG. 3 is a block diagram of an example head-mounted device (HMD) in accordance with some implementations.

FIG. 3 is a block diagram of an example of the HMD 120B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120B includes a single CGR display. In another example, the HMD 120B includes a CGR display for each eye of the user. In some implementations, the one or more CGR displays 312 are capable of presenting MR and VR content. In some implementations, the one or more CGR displays 312 are capable of presenting MR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120B was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR generating unit 344, a CGR/audio presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the CGR generating unit 344 is configured to generate CGR content to accompany audio of a file based on natural language analysis of corresponding lyrics and semantic analysis based on the results of the natural language analysis and the audio. To that end, in various implementations, the CGR immersion unit 344 includes instructions and/or logic therefor, and heuristics and metadata therefor.

In some implementations, the CGR/audio presenting unit 346 is configured to present the CGR content via the one or more CGR displays 312 and the audio via the one or more speakers 307B. To that end, in various implementations, the CGR/audio presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR generating unit 344, the CGR/audio presenting unit 346, and the data transmitting unit 348 are shown as residing on a single device (e.g., the HMD 120B of FIG. 1B), it should be understood that in other implementations, any combination of the data obtaining unit 342, the CGR generating unit 344, the CGR/audio presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
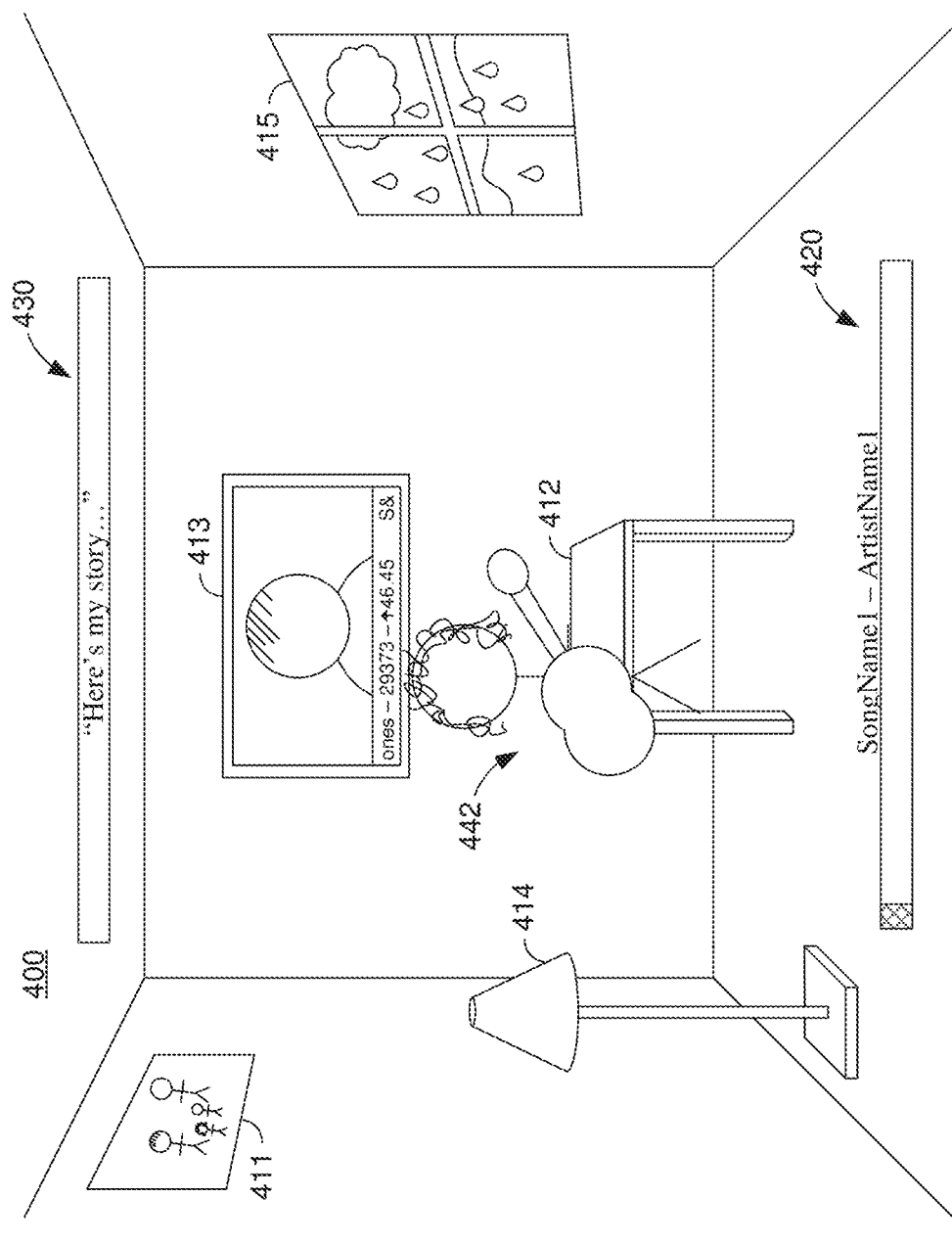
FIGS. 4A-4C illustrate a first CGR environment with CGR content generated based on natural language analysis and semantic analysis of a first audio file in accordance with some implementations.
Figure 4B:
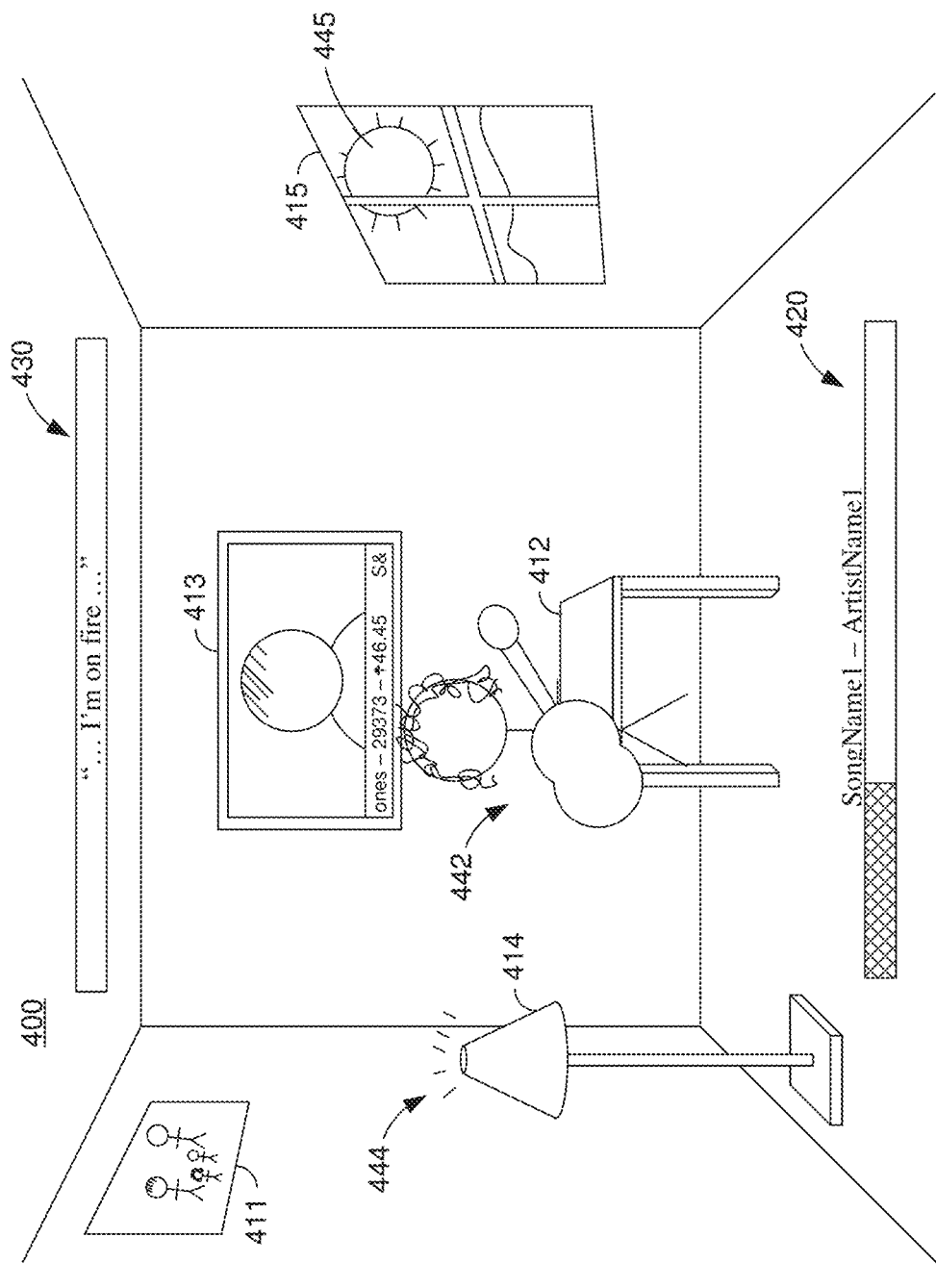
Figure 4C:
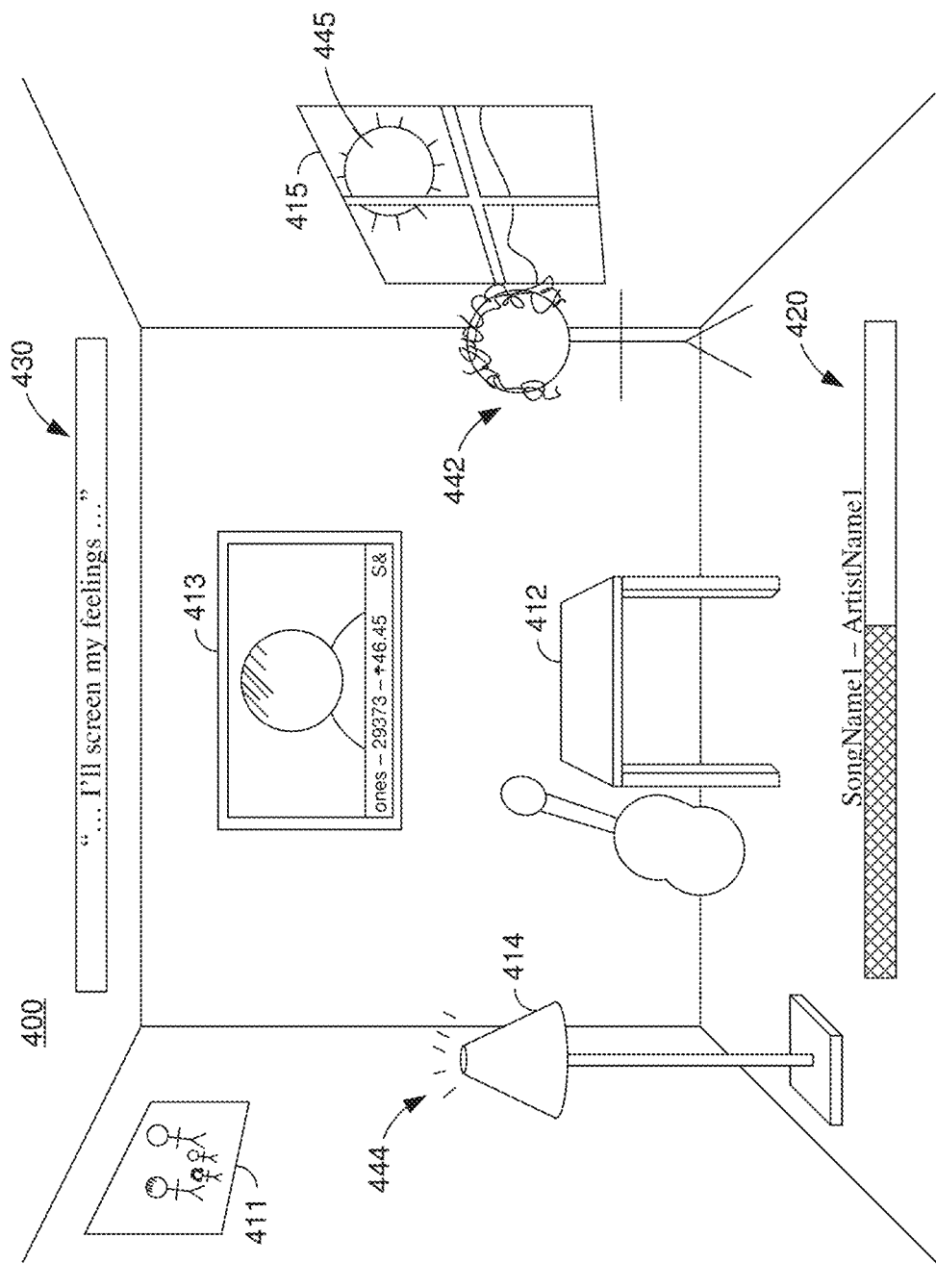

FIGS. 4A-4C illustrate a first CGR environment 400 based on a real environment surveyed by a scene camera of a device with CGR content generated based on semantic analysis of a first audio file (e.g., a song entitled "SongName1" by an artist named "ArtistName1") including audio data and lyrics data.

In various implementations, the scene camera is part of a device that is worn by the user and includes a display that displays the first CGR environment 400 (e.g., an HMD). Thus, in various implementations, the user is physically present in the environment. In various implementations, the scene camera is part of remote device (such as a drone or robotic avatar) that transmits images from the scene camera to a local device that is worn by the user and includes a display that displays the first CGR environment 400.

FIG. 4A illustrates the first CGR environment 400 at a first time during playback of the first audio file. The first CGR environment 400 includes a plurality of objects, including one or more real objects (e.g., a picture 411, a table 412, a television 413, a lamp 414, and a window 415) and one or more virtual objects (an audio playback indicator 420, a lyric indicator 430, and a representation of ArtistName1 442 sitting on the table 412). In various implementations, each object is displayed at a location in the first CGR environment 400, e.g., at a location defined by three coordinates in a three-dimensional (3D) CGR coordinate system. Accordingly, when the user moves in the first CGR environment 400 (e.g., changes either position and/or orientation), the objects are moved on the display of the HMD, but retain their location in the first CGR environment 400. In various implementations, certain virtual objects (such as the audio playback indicator 420 and the lyric indicator 430) are displayed at locations on the display such that when the user moves in the first CGR environment 400, the objects are stationary on the display of the HMD.

The audio playback indicator 420 includes information regarding playback of an audio file. In various implementations, the audio file is associated with a timeline such that, at various times, various portions of the audio file are played. In various implementations, the audio playback indicator 420 includes text, such as an artist associated with the audio file and/or a title associated with the audio file. In various implementations, the audio playback indicator 420 includes an audio progress bar that indicates the current position in the timeline of the audio file being played. Although the audio playback indicator 420 is displayed in FIG. 4A, in various implementations, the audio playback indicator 420 is not displayed, even though an audio file is being played.

The lyric indicator 430 includes display of text of lyrics corresponding to the portion of the audio file currently being played. Although the lyric indicator 430 is displayed in FIG. 4A, in various implementations, the lyric indicator 430 is not displayed.

At the first time, the lyric indicator 430 indicates lyrics of "Here's my story . . . " and the first CGR environment 400 includes a representation of ArtistName1 442 sitting on the table 412.

FIG. 4B illustrates the first CGR environment 400 of FIG. 4A at a second time during playback of the first audio file. At the second time, the lyric indicator 430 indicates lyrics of " . . . I'm on fire . . . " and the first CGR environment 400 includes, in addition to the representation of ArtistName1 442, a virtual view 445 replacing the window 415 with a sunny background and an increased brightness 444 emanating from the lamp 414.

FIG. 4B illustrates the first CGR environment 400 of FIG. 4A at a third time during playback of the first audio file. At the third time, the lyric indicator 430 indicates lyrics of " . . . I'll screen my feelings . . . " and the first CGR environment 400 includes the representation of ArtistName1 442 looking out the window 415.

Figure 5B:
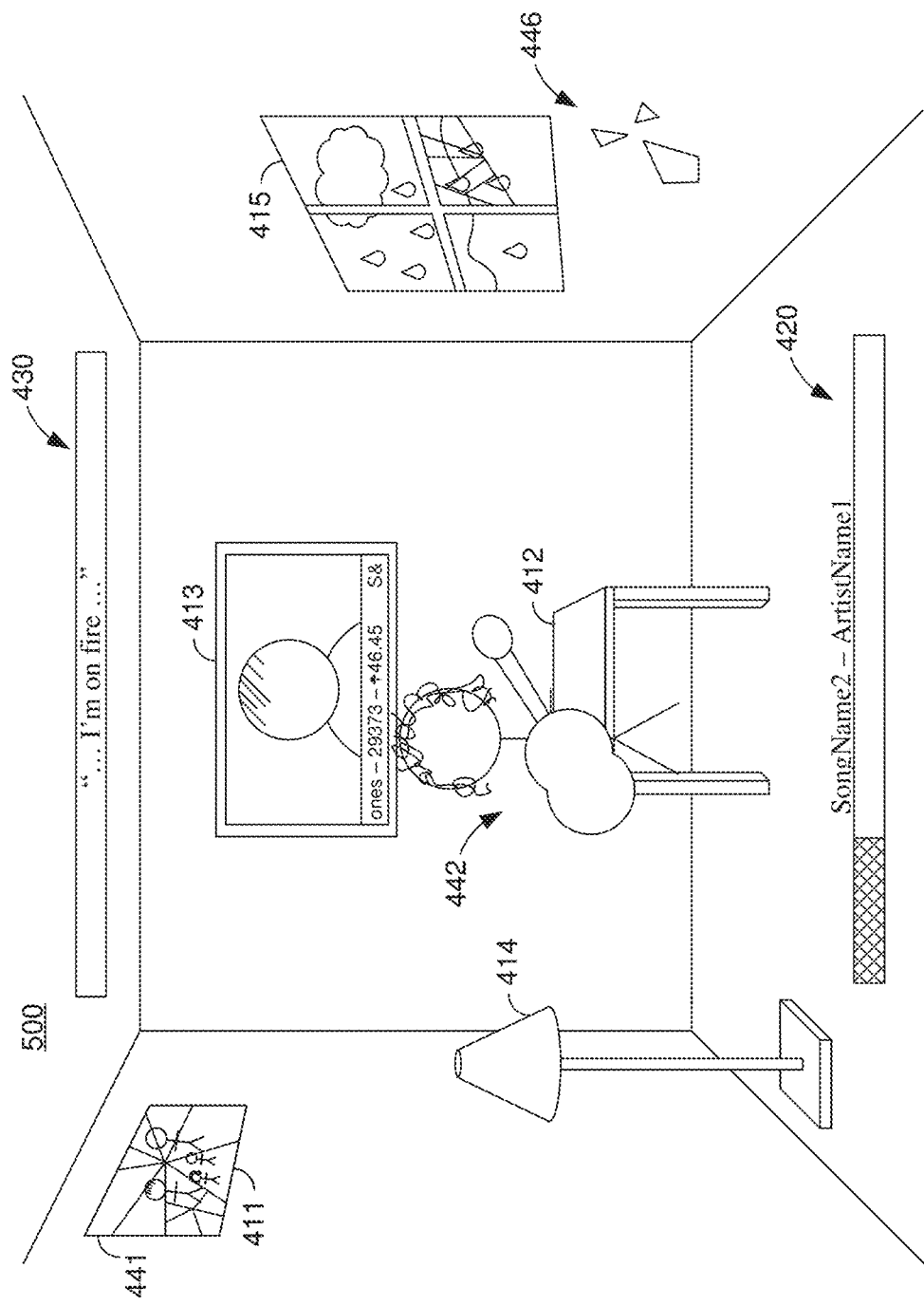
Figure 5C:
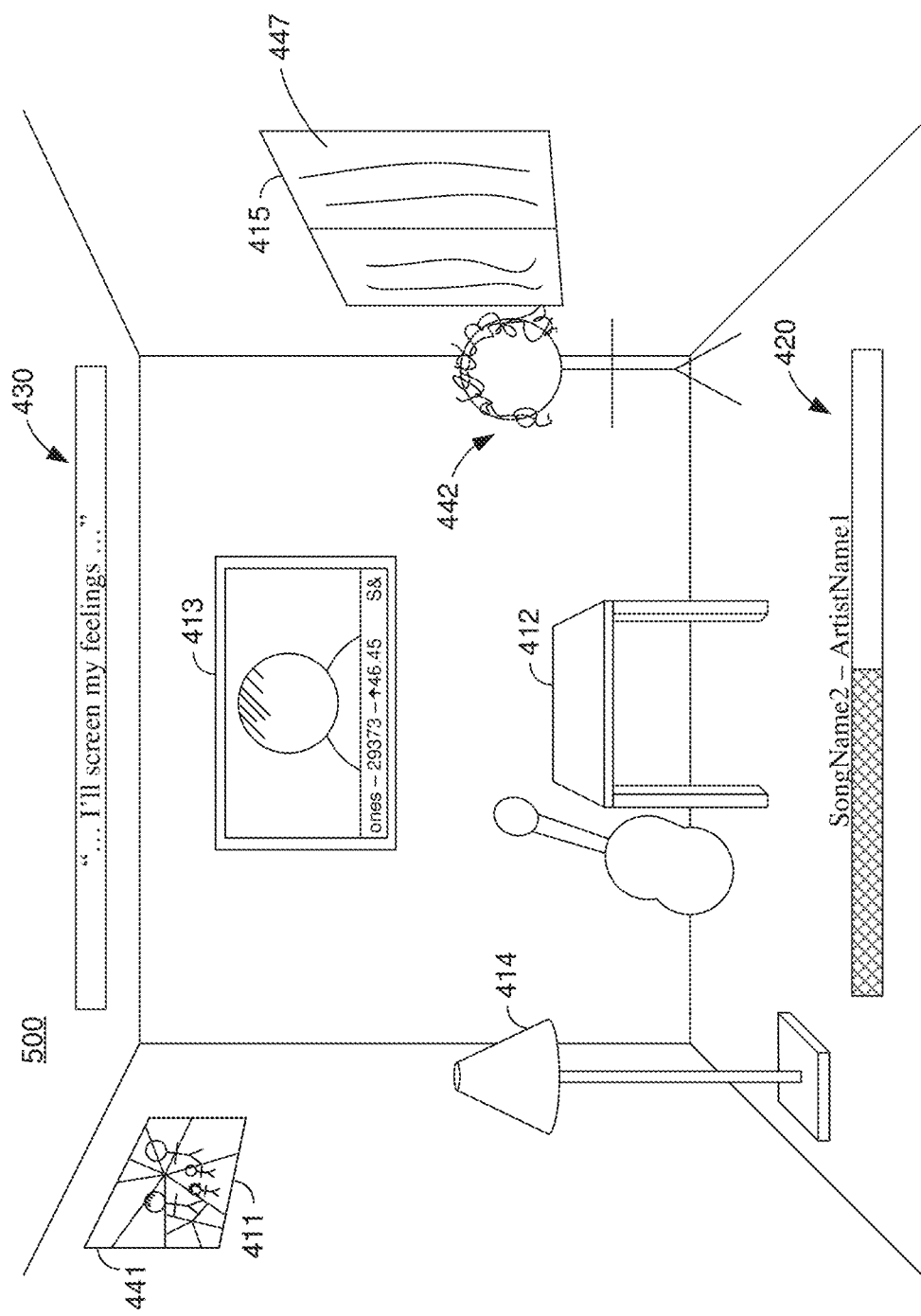

FIGS. 5A-5C illustrate a second CGR environment 500 based on the real environment of FIGS. 4A-4C with CGR content generated based on semantic analysis of a second audio file (e.g., a song entitled "SongName2" by an artist named "ArtistName1") including audio data and lyric data. The second audio file has very different audio data than the first audio file but at least partially similar lyric data.

FIG. 5A illustrates the second CGR environment 500 at a first time during playback of the second audio file. At the first time, the lyric indicator 430 indicates lyrics of "Here's my story . . . " and the second CGR environment 500 includes the representation of ArtistName1 442 sitting on the table 412.

FIG. 5B illustrates the second CGR environment 500 of FIG. 5A at a second time during playback of the second audio file. At the second time, the lyric indicator 430 indicates lyrics of " . . . I'm on fire . . . " and the second CGR environment 500 includes, in addition to the representation of ArtistName1 442, a first virtual breakage 441 over the picture 411 and a second virtual breakage 446 over the window 415.

FIG. 5C illustrates the second CGR environment 500 of FIG. 5A at a third time during playback of the second audio file. At the third time, the lyric indicator 430 indicates lyrics of " . . . I'll screen my feelings . . . " and the second CGR environment 500 includes the representation of ArtistName1 442 drawing curtains 447 over the window 415.

Figure 6:
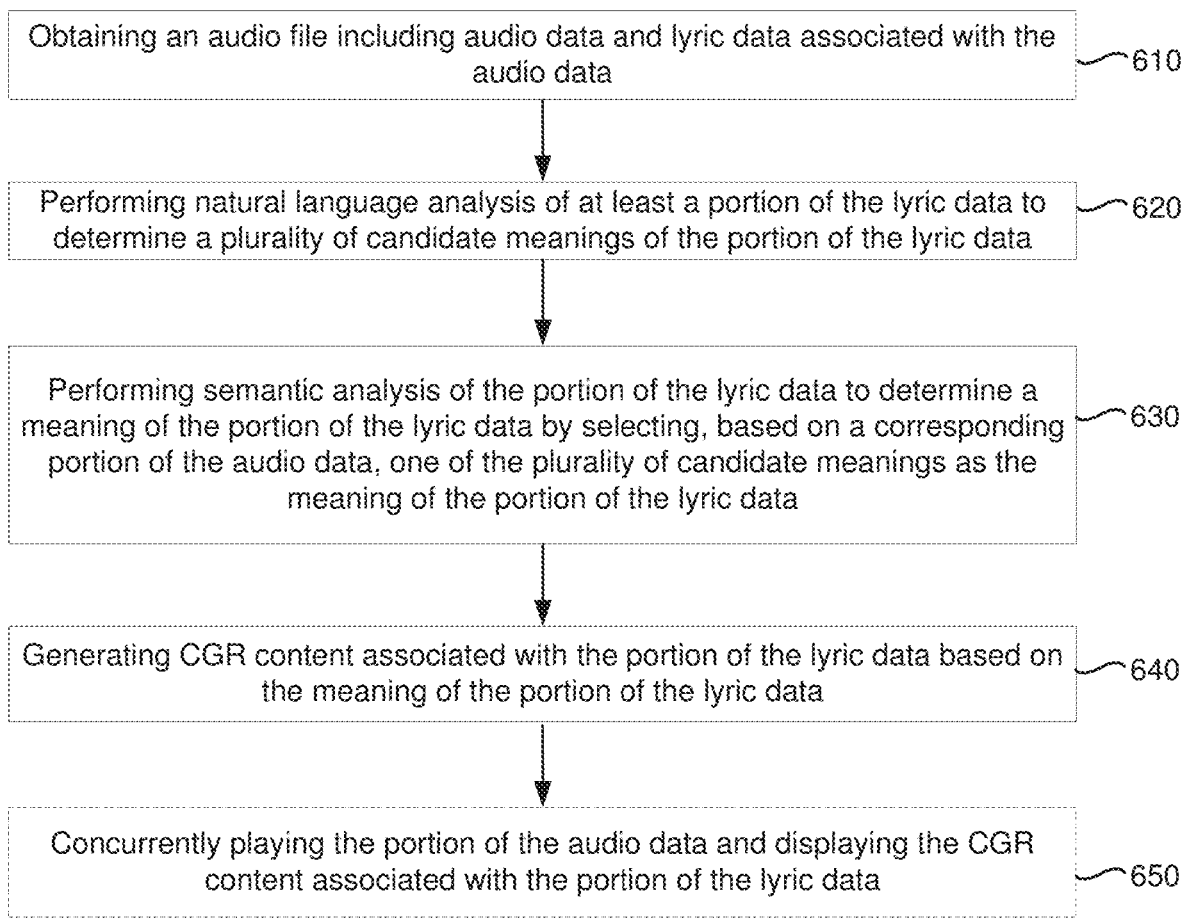
FIG. 6 is a flowchart representation of a method of generating CGR content to accompany an audio file including audio data and lyric data based on semantic analysis of the audio data and the lyric data in accordance with some implementations.

FIG. 6 is a flowchart representation of a method 600 of generating CGR content to accompany an audio file including audio data and lyric data based on semantic analysis of the audio data and the lyric data in accordance with some implementations. In various implementations, the method 600 is performed by a device with one or more processors, non-transitory memory, a scene camera, a speaker, and a display (e.g., the HMD 120B of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining an audio file including audio data and lyric data associated with the audio data. In various implementations, the audio file is an MP3 file, an AAC file, a WAV file, etc. In various implementations, the audio file includes audio data representing music and/or spoken words (e.g., an audiobook). In various implementations, the audio file has an associated timeline such that, at various times, various portions of the audio data are played. Further, the timeline associates various portions of the lyric data with corresponding portions of the audio data, indicating the lyrics of particular portions of the audio data at particular times.

The method 600 continues, in block 720, with the device performing natural language analysis of at least a portion of the lyric data to determine a plurality of candidate meanings of the portion of the lyric data.

For example, the phrase "on fire" can mean, among other things, (1) "engulfed in flames", (2) "madly in love" or at least "desirous", or (3) "incredibly angry". Accordingly, by performing natural language analysis of lyric data indicating lyrics of " . . . I'm on fire . . . ", the device determines candidate meanings of "aflame", "in love", and "angry".

As another example, the word "screen" can mean, among other things, (1) "investigate" as in screening potential candidates for a job, (2) "reveal" as in screening a movie to critics, or (3) "conceal" as in screening one's face with a veil. Accordingly, by performing natural language analysis of lyric data indicating lyrics of " . . . I'll screen my feelings . . . ", the device determines candidate meanings of "search emotions", "show emotions", and "hide emotions".

In various implementations, each of the plurality of candidate meanings are associated with an initial probability metric indicating the likelihood that the candidate meaning is the meaning of the lyrics. In various implementations, the initial probability metric is based on a commonality of usage of the candidate meaning.

In various implementations, the initial probability metrics are based on other metadata of the audio file. For example, the initial probability metrics may be based on data indicating an artist associated with the audio file, or, in particular, a nationality of the artist. For example, the term "table" can mean "put up for debate" (particularly, in British English) or "remove from debate" (particularly, in American English). Thus, if the nationality of the artist is British, the initial probability metric for a candidate meaning of "put up for debate" may be greater than the initial probability metric for a candidate meaning of "remove from debate", but if the nationality of the artist is American, the initial probability metric for candidate meaning of "put up for debate" may be less than the initial probability metric for a candidate meaning of "remove from debate", As another example, the initial probability metrics may be based on a data indicating a date (e.g., a year of release) associated with the audio file. For example, the word "awful", which now has a negative connotation once had a positive connotation of "awe-inspiring". Conversely, the words "bad" or "sick", which originally had negative connotations, may now have positive connotations.

As another example, the initial probability metrics may be based on data indicating a genre associated with the audio file. For example, the word "rock" may have loud connotations in an audio file associated with a "Metal" genre (e.g., "rock out") but a quiet connotation in an audio file associated with a "Lullaby" genre (e.g., "rock to sleep").

The method 600 continues, in block 630, with the device performing semantic analysis of the portion of the lyric data to determine a meaning of the portion of the lyric data by selecting, based on a corresponding portion of the audio data, one of the plurality of candidate meanings as the meaning of the portion of the lyric data.

In various implementations, the device selects the one of the plurality of candidate meanings as the meaning of the portion of the lyrics based on the key, tempo, rhythm, or vocal timbre of the corresponding portion of the audio data. In various implementations, the device determines updated probability metrics for each of the plurality of candidate meanings based on the initial probability metrics and the corresponding portion of the audio data. Further, the device selects the one of the plurality of candidate meanings with the highest updated probability metric as the meaning of the portion of the lyric data.

Following the example given above, by performing natural language analysis of lyric data indicating lyrics of " . . . I'm on fire . . . ", the device determines candidate meanings of "aflame", "in love", and "angry" with corresponding initial probability metrics. For the first audio file, the device performs semantic analysis by determining that the key is a major key, the tempo is slow, and the vocal timbre is soft; determining updated probability metrics in which the initial probability metric for "in love" is increased and the others are decreased; and selecting "in love" as the meaning based on its now highest probability metric. For the second audio file, the device performs semantic analysis by determining that the key is a minor key, the tempo is fast, and the vocal timbre is rough; determining updated probability metrics in which the initial probability metric for "angry" is increased and the others are decreased; and selecting "angry" as the meaning based on its now highest probability metric.

Figure 7:
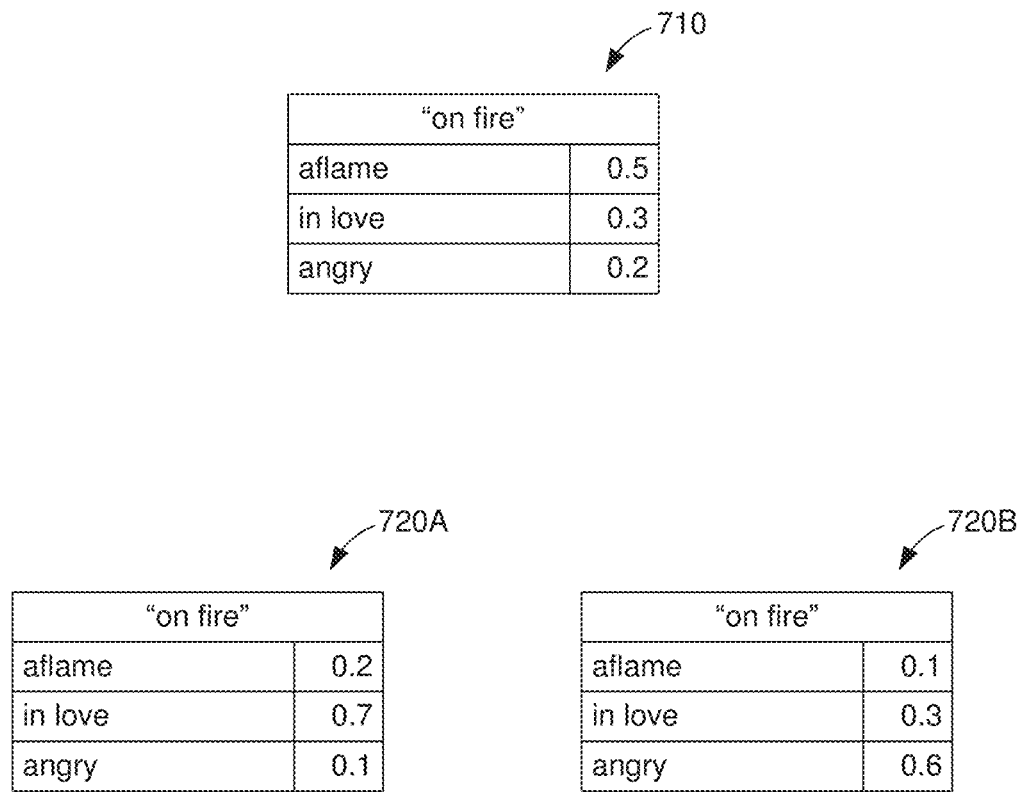
FIG. 7 illustrates example probability tables in accordance with some implementations.

FIG. 7 illustrates an initial probability table 710 indicating initial probability metrics of the candidate meanings of "aflame", "in love", and "angry" after natural language analysis. FIG. 7 illustrates a first updated probability table 720A indicating updated probability metrics after semantic analysis of the first audio file. FIG. 7 illustrates a second updated probability table 720B indicating updated probability metrics after semantic analysis of the second audio file.

Following the other example given above, by performing natural language analysis of lyric data indicating lyrics of " . . . I'll screen my feelings . . . ", the device determines candidate meanings of "search emotions", "show emotions", and "hide emotions" with corresponding initial probability metrics. For the first audio file, the device performs semantic analysis by determining that the key is a major key, the tempo is slow, and the vocal timbre is soft; determining updated probability metrics in which the initial probability metric for "show emotions" is increased and the others are decreased; and selecting "show emotions" as the meaning based on its now highest probability metric. For the second audio file, the device performs semantic analysis by determining that the key is a minor key, the tempo is fast, and the vocal timbre is rough; determining updated probability metrics in which the initial probability metric for "hide emotions" is increased and the others are decreased; and selecting "hide emotions" as the meaning based on its now highest probability metric.

In various implementations, the device determines a mood (or sentiment, feeling, or connotation) of the corresponding portion of the audio data based on, e.g., the key, tempo, rhythm, or vocal timbre of the corresponding portion of the audio data. In various implementations, the mood is a positive mood or a negative mood. In various implementations, the mood is a positive mood, neutral mood, or a negative mood. In various implementations, the mood is a happy mood, sad mood, angry mood, or scared mood. In various implementations, the mood is a love mood, a party mood, a pensive mood, a broken-hearted mood, etc. Thus, in various implementations, the device classifies the portion of the audio data based on, e.g., the key, tempo, rhythm, or vocal timbre of the corresponding portion of the audio data. In various implementations, the device classifies the portion of the audio data based on other audio data of the audio file in addition to the portion of the audio data. In various implementations, the device classifies the portion of the audio data using a machine-learning classifier.

Following the example given above, by performing natural language analysis of lyric data indicating lyrics of " . . . I'm on fire . . . ", the device determines candidate meanings of "aflame", "in love", and "angry" with corresponding initial probability metrics. For the first audio file, the device performs semantic analysis by classifying the portion of the audio data as a positive mood; determining updated probability metrics in which the initial probability metric for "in love" is increased and the others are decreased; and selecting "in love" as the meaning based on its now highest probability metric. For the second audio file, the device performs semantic analysis by classifying the portion of the audio data as a negative mood; determining updated probability metrics in which the initial probability metric for "angry" is increased and the others are decreased; and selecting "angry" as the meaning based on its now highest probability metric.

Following the other example given above, by performing natural language analysis of lyric data indicating lyrics of " . . . I'll screen my feelings . . . ", the device determines candidate meanings of "search emotions", "show emotions", and "hide emotions" with corresponding initial probability metrics. For the first audio file, the device performs semantic analysis by classifying the portion of the audio data as a positive mood; determining updated probability metrics in which the initial probability metric for "show emotions" is increased and the others are decreased; and selecting "show emotions" as the meaning based on its now highest probability metric. For the second audio file, the device performs semantic analysis by classifying the portion of the audio data as a negative mood; determining updated probability metrics in which the initial probability metric for "hide emotions" is increased and the others are decreased; and selecting "hide emotions" as the meaning based on its now highest probability metric.

The method 600 continues, at block 640, with the device generating CGR content associated with the portion of the lyric data based on the meaning of the portion of the lyric data.

For example, with reference to FIG. 4B, based on a meaning of "in love", the device generates CGR content in the form of the virtual view 445 replacing the window 415 with a sunny background. As another example, with reference to FIG. 4C, based on a meaning of "show emotions", the device generates CGR content in the form of the representation of ArtistName1 442, looking out the window 415, thereby showing his emotions to the outside world. As another example, with reference to FIG. 5B, based on a meaning of "angry", the device generates CGR content in the form of the first virtual breakage 441 over the picture 411. As another example, with reference to FIG. 5C, based on a meaning of "hide emotions", the device generates CGR content in the form of the representation of ArtistName1 442 drawing curtains 447 over the window 415, thereby hiding his emotions from the outside world.

In various implementations, the device generates the CGR content further based on the corresponding portion of the audio data, in particular, based on the mood of the corresponding portion of the audio data. For example, with reference to FIG. 4B, based on a positive mood, the device generates CGR content in the form of the increased brightness 444 emanating from the lamp 414. As another example, with reference to FIG. 5B, based on a negative mood, the device generates CGR content in the form of the second virtual breakage 446 over the window 415.

In various implementations, the brightness, color, size, and/or immersion level of the CGR content is based on the mood.

In various implementations, the device generates the CGR content further based on metadata of the audio file, such as a title, artist, album, genre, etc. For example, in FIGS. 4A-4C, the device generates the representation of ArtistName1 422 based on metadata indicating an artist of "ArtistName1".

In various implementations, the device generates the CGR content further based on a 3D point cloud of the environment, such as surfaces or objects meeting presentation criteria. For example, in FIG. 5B, the device generates CGR content including the first virtual breakage 441 based on detecting the picture 411. As another example, in FIG. 4B, the device generates CGR content including the virtual view 445 with a sunny background based on detecting the window 415. As another example, in FIG. 4B and FIG. 5B, the device generates CGR content including the representation of ArtistName1 442 sitting on the table 412 based on detecting the table 412.

In various implementations, the method 600 optionally includes, in block 650, concurrently playing, via a speaker, the portion of the audio data and displaying, on a display, the CGR content associated with the portion of the lyric data.

By incorporating semantic analysis (in block 630), the method 600 generates more relevant CGR content than might be generated by natural language analysis (in block 620) alone. As an example, the first CGR environment 400 of FIGS. 4A-4C includes more intuitive and relevant CGR content than the CGR content that might be presented based on the initial probability table 710 of FIG. 7. Further, in various implementations, incorporating semantic analysis (in block 630) results in different CGR content being generated (in block 640) for different songs, even based on the same lyrics. For example, the second CGR environment 500 of FIGS. 5A-5C includes different (indeed, opposite) CGR content than the CGR content presented in the first CGR environment 400 of FIGS. 4A-4C.

FIGS. 8A-8D illustrate a fourth CGR environment 800 based on the real environment of FIGS. 5A-5C with CGR content generated based on two different audio files, a third audio file (e.g., a third song entitled "SongName3" by an artist named "ArtistName3") and a fourth audio file (e.g., a fourth song entitled "SongName4" by an artist named "ArtistName4").

Figure 8A:
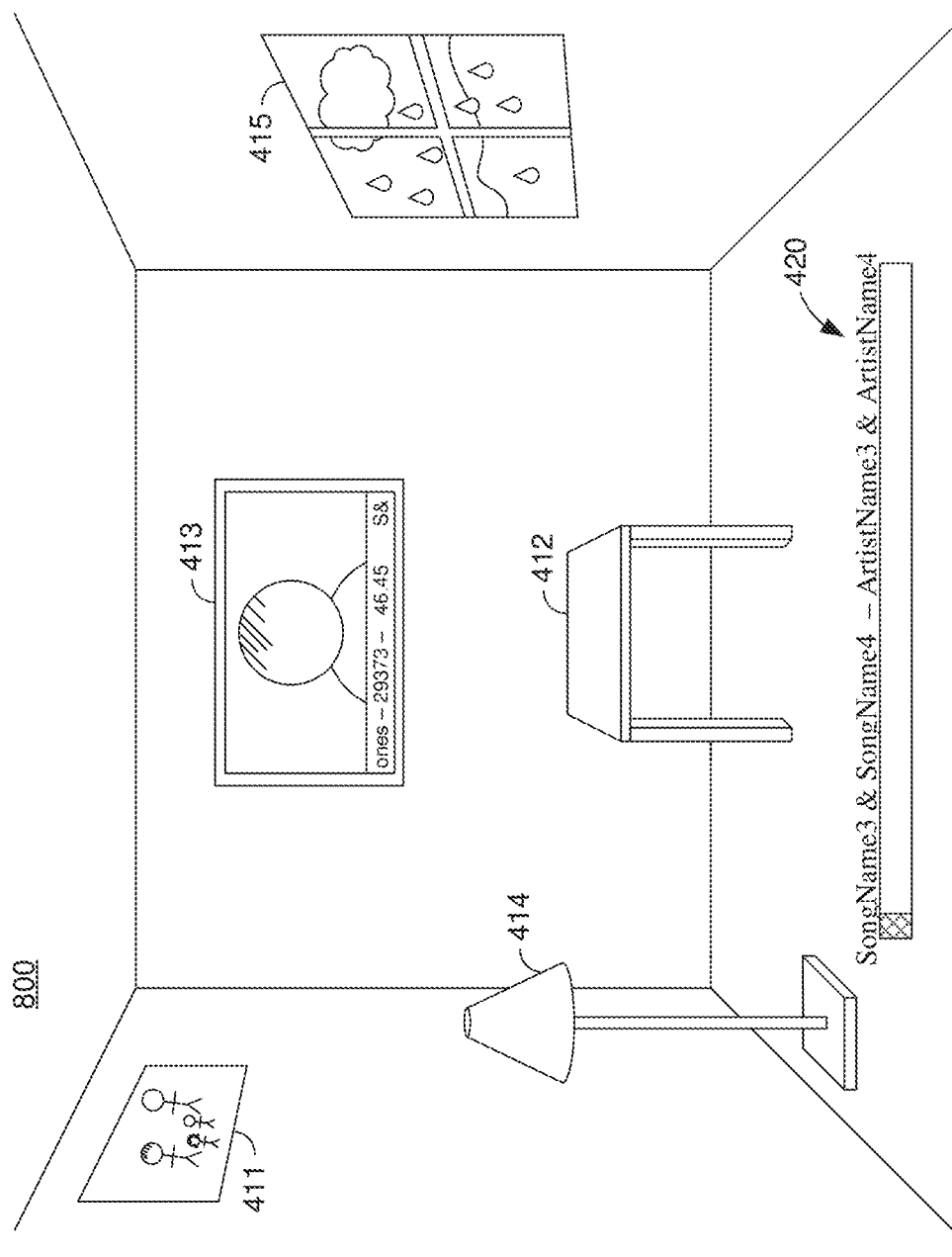
FIGS. 8A-8D illustrate a fourth CGR environment with CGR content generated based on two different audio files in accordance with some implementations.

FIG. 8A illustrates the fourth CGR environment 800 at a first time during playback of a mashup of the third audio file and the fourth audio file. At the first time, a first segment of the third audio file and a first segment of the fourth audio file are played concurrently. Further, at the first time, the fourth CGR environment 800 includes no CGR content (other than the audio playback indicator 420).

Figure 8B:
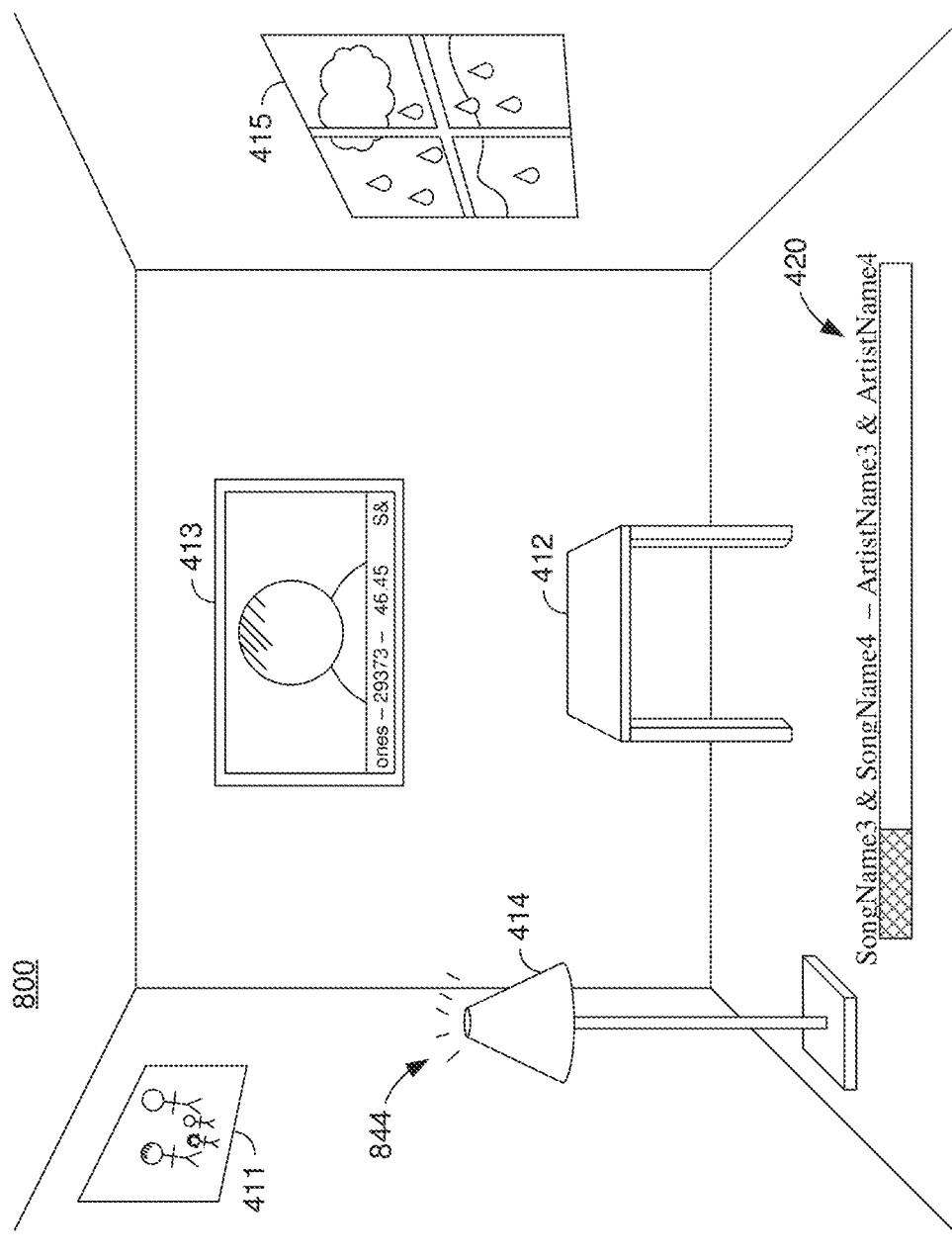

FIG. 8B illustrates the fourth CGR environment 800 of FIG. 8A at a second time during playback of a mashup of the third audio file and the fourth audio file. At the second time, a second segment of the third audio file and a second segment of the fourth audio file are played concurrently. In response to the second segment of the third audio file and the second segment of the fourth audio file having a matching tempo, the fourth CGR environment 800, at the second time in FIG. 8B, includes a virtual light pulsation 844 emanating from the lamp that pulses in synch with the matching tempo.

Figure 8C:
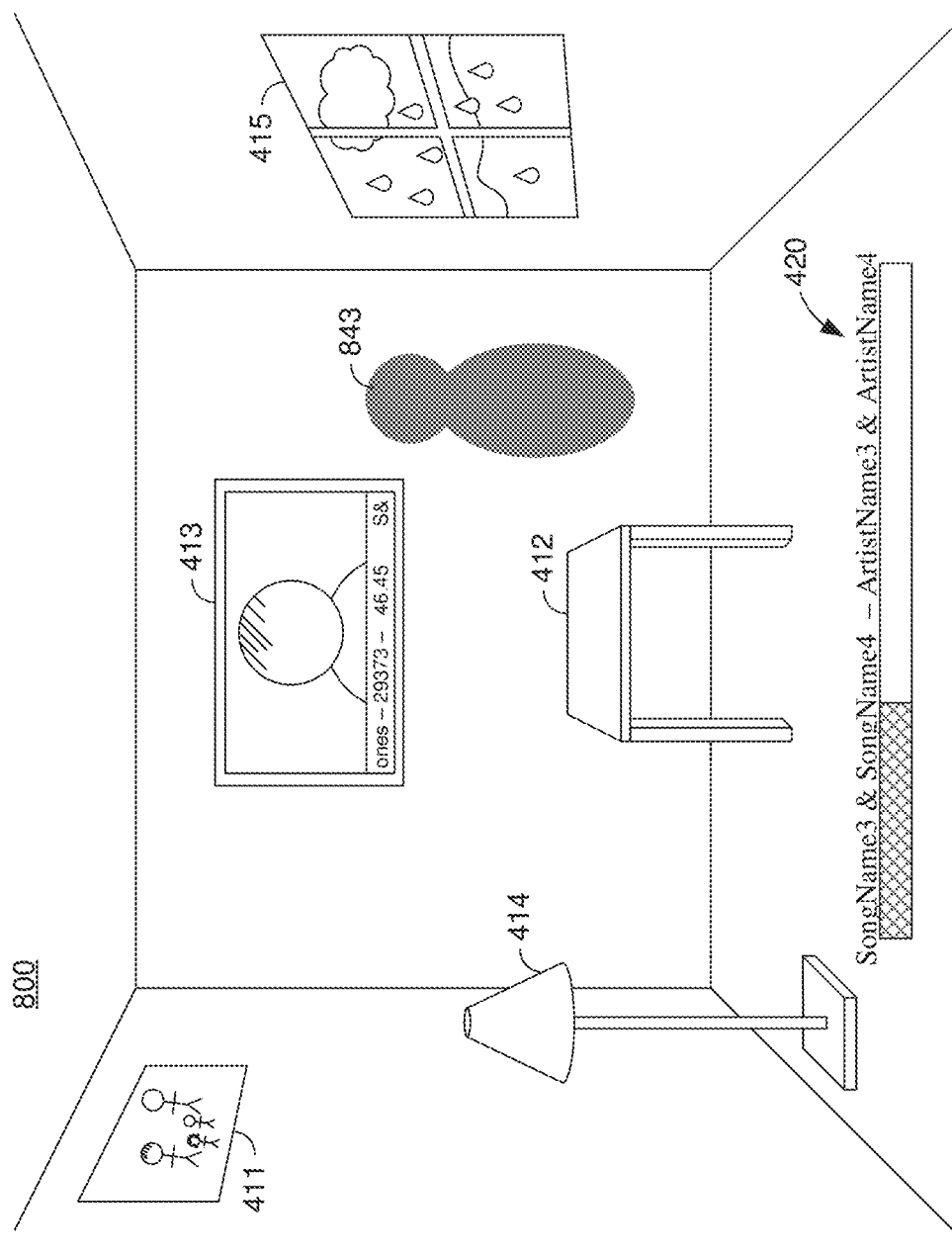

FIG. 8C illustrates the fourth CGR environment 800 of FIG. 8A at a third time during playback of a mashup of the third audio file and the fourth audio file. At the third time, a third segment of the third audio file and a third segment of the fourth audio file are played concurrently. In response to the third segment of the third audio file and the third segment of the fourth audio file having matching semantic content (e.g., both segments include lyrics having a meaning of "shadow", the fourth CGR environment 800, at the third time in FIG. 8C, includes a virtual shadow 843 on the back wall.

Figure 8D:
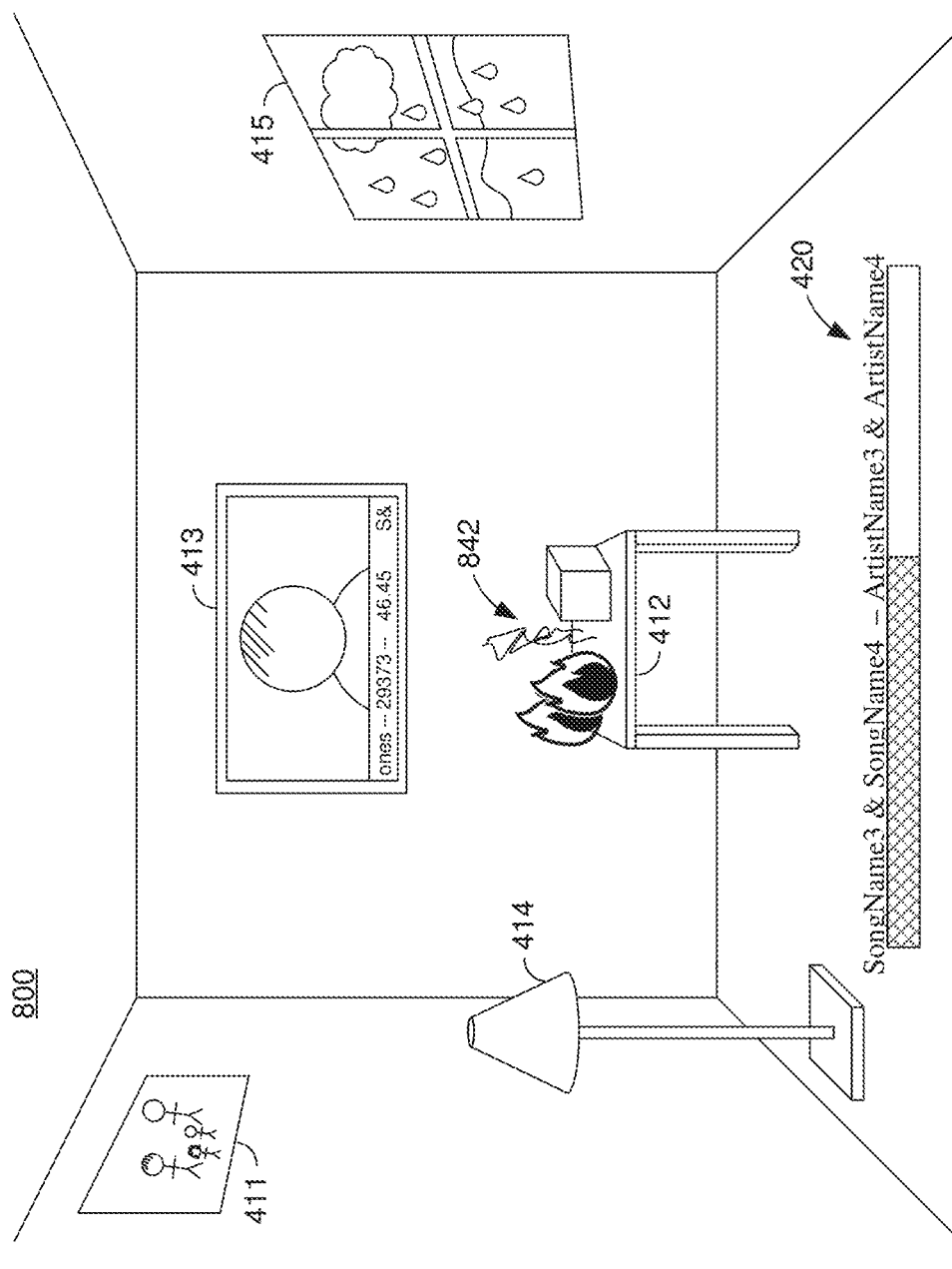

FIG. 8D illustrates the fourth CGR environment 800 of FIG. 8A at a fourth time during playback of a mashup of the third audio file and the fourth audio file. At the fourth time, a fourth segment of the third audio file and a fourth segment of the fourth audio file are played concurrently. In response to the fourth segment of the third audio file and the fourth segment of the fourth audio file having contrasting semantic content (e.g., one fourth segment include lyrics having a meaning of "fire" and the other fourth segment includes lyrics having a meaning of "ice"), the fourth CGR environment 800, at the fourth time in FIG. 8D, includes a virtual melting 842 on the table 412 illustrating fire melting a cube of ice, with steam therebetween.

Figure 9:
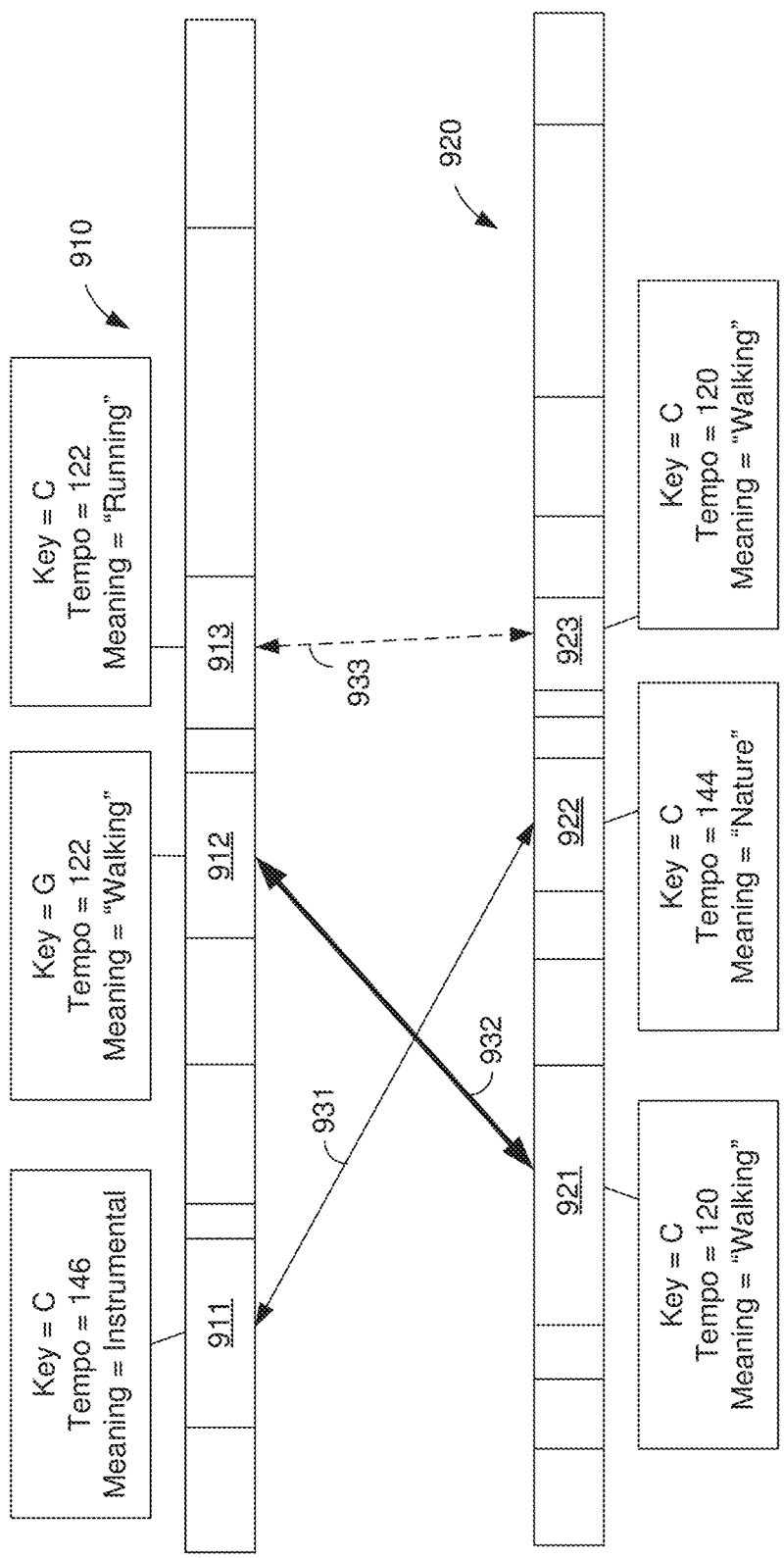
FIG. 9 illustrates a first audio file and a second audio file in accordance with some implementations.

FIG. 9 illustrates a first audio file 910 and a second audio file 920 in accordance with some implementations. The first audio file 910 is parsed into a first plurality of segments. The first plurality of segments includes, among others, a first segment 911 associated with first segment metadata, a second segment 912 associated with second segment metadata, and a third segment 913 associated with third segment metadata. The second audio file 920 is parsed into a second plurality of segments. The second plurality of segments includes, among others, a fourth segment 921 associated with fourth segment metadata, a fifth segment 922 associated with fifth segment metadata, and a sixth segment 923 associated with sixth segment metadata.

In various implementations, relationships between segment metadata of a respective segment of the first audio file and segment metadata of respective segment of the second audio file are determined. For example, in FIG. 9, a matching audio relationship 931 is determined between the first segment 911 and the fifth segment 922 based on their respective metadata indicating the same (or, at least, substantially the same) keys and the same (or, at least, substantially the same) tempo. As another example, a matching semantic relationship 932 is determined between the second segment 912 and the fourth segment 921 based on their respective metadata indicating the same meaning. As another example, a contrasting semantic relationship 933 is determined between the third segment 913 and the sixth segment 923 based on their respective metadata indicating contrasting meanings.

Figure 10:
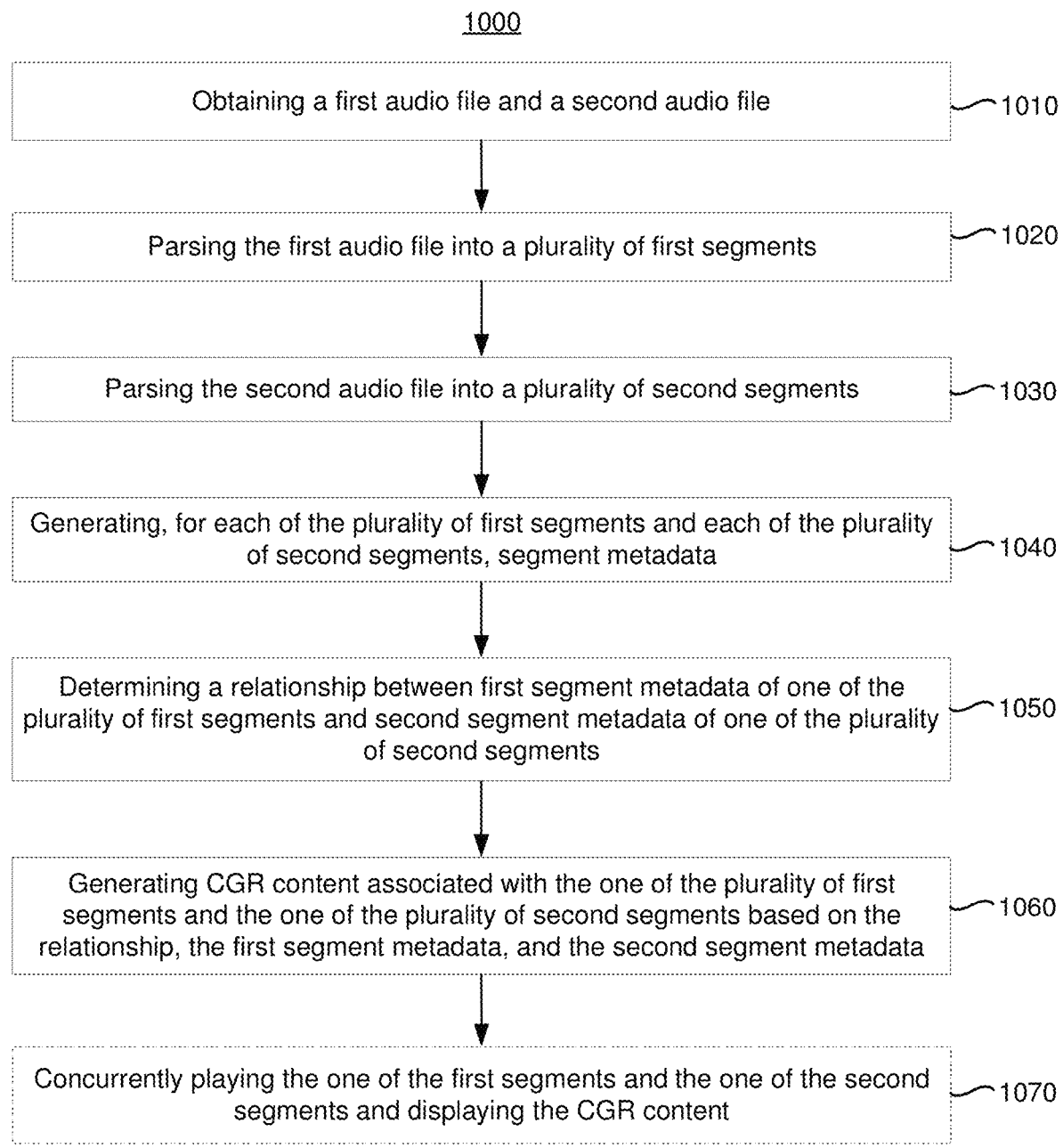
FIG. 10 is a flowchart representation of a method of generating CGR content to accompany a mashup of two audio files in accordance with some implementations.

FIG. 10 is a flowchart representation of a method 1000 of generating CGR content to accompany a mashup of two audio files in accordance with some implementations. In various implementations, the method 1000 is performed by a device with one or more processors, non-transitory memory, a scene camera, a speaker, and a display (e.g., the HMD 120B of FIG. 3). In some implementations, the method 1000 is performed by processing logic, including hardware, firmware, software, or a combination thereof. In some implementations, the method 900 is performed by a processor executing instructions (e.g., code) stored in a non-transitory computer-readable medium (e.g., a memory).

The method 1000 begins, in block 1010, with the device obtaining a first audio file and a second audio file. In various implementations, the first audio file (and/or the second audio file) is an MP3 file, an AAC file, a WAV file, etc. In various implementations, the first audio file (and/or the second audio file) includes audio data representing music and/or spoken words (e.g., an audiobook). In various implementations, the first audio file (and/or the second audio file) has an associated timeline such that, at various times, various portions of the audio data are played during playback of the audio file (but not necessarily during playback of a mashup including the audio file). Further, the timeline associates various portions of the lyric data with corresponding portions of the audio data, indicating the lyrics of particular portions of the audio data at particular times.

The method 1000 continues, in block 1020, with the device parsing the first audio file into a plurality of first segments. In various implementations, the first audio file is parsed into segments, each segment indicating a chorus or verse. In various implementations, the first audio file is parsed into segments, each segment indicating a line of lyrics. In various implementations, the device parses the first audio file based on user input. In various implementations, the device parses the first audio file automatically, e.g., based on frequency tracking or temporal metadata included in the lyric data.

The method 1000 continues, in block 1030, with the device parsing the second audio file into a plurality of second segments. In various implementations, the second audio file is parsed into segments, each segment indicating a chorus or verse. In various implementations, the second audio file is parsed into segments, each segment indicating a line of lyrics. In various implementations, the device parses the second audio file based on user input. In various implementations, the device parses the second audio file automatically, e.g., based on frequency tracking or temporal metadata included in the lyric data.

The method 1000 continues, in block 1040, with the device generating, for each of the plurality of first segments and each of the plurality of second segments, segment metadata. In various implementations, the segment metadata indicates a key of the segment. In various implementations, the segment metadata indicates a tempo of the segment. In various implementations, the segment metadata indicates a rhythm of the segment. In various implementations, the segment metadata indicates a mood of the segment. In various implementations, the segment metadata indicates lyrics of the segment. In various implementations, the segment metadata indicates a meaning of the segment as derived by semantic analysis of both the lyric data and the audio data.

The method 1000 continues, in block 1050, with the device determining a relationship between first segment metadata of one of the plurality of first segments and second segment metadata of one of the plurality of second segments. In various implementations, the relationship is a matching relationship. For example, if the first segment metadata indicates the same (or, at least, substantially the same) key as the second segment metadata, a matching key relationship is determined. If the first segment metadata indicates the same (or, at least, substantially the same) tempo as the second segment metadata, a matching tempo relationship is determined. In various implementations, if a matching key relationship and a matching tempo relationship is determined, a matching audio relationship is determined. As another example, if the first segment metadata indicates the same (or, at least a similar) meaning as the second segment metadata, a matching semantic relationship is determined.

In various implementations, the relationship is a complementary relationship. For example, if the first segment metadata indicates a first key that is consonant (or, at least close to consonant) with a second key indicated by the second segment metadata, a complementary key relationship is determined. If the first segment metadata indicates a first tempo that is at least approximately proportional to (e.g., half, twice, or 1.5×) a second tempo indicated by the second segment metadata, a complementary tempo relationship is determined. As another example, if the first segment metadata indicates a first meaning that is an element of a set that is a second meaning indicated by the second segment metadata, a complementary semantic relationship is determined. For example, the first meaning may be "red" or "dog" and the second meaning may be "color" or "animal".

In various implementations, the relationship is a contrasting relationship. For example, if the first segment metadata indicates a first key that is dissonant with a second key indicated by the second segment metadata, a contrasting key relationship is determined. As another example, if the first segment metadata indicates the opposite (or, at least a contrasting) meaning as the second segment metadata, a contrasting semantic relationship is determined.

The method 1000 continues, in block 1050, with the device generating CGR content associated with the one of the plurality of first segments and the one of the plurality of second segments based on the relationship, the first segment metadata, and the second segment metadata.

In various implementations, the relationship is a matching relationship and the device generates CGR content based on the matched metadata. For example, in FIG. 8B, in response to the second segment of the third audio file and the second segment of the fourth audio file having a matching tempo, the fourth CGR environment 800 includes the virtual light pulsation 844 emanating from the lamp that pulses in synch with the matching tempo. As another example, in FIG. 8C, in response to the third segment of the third audio file and the third segment of the fourth audio file having matching semantic content (e.g., both segments include lyrics having a meaning of "shadow"), the fourth CGR environment 800 includes the virtual shadow 843 on the back wall.

In various implementations, the relationship is a complementary relationship and the device generates CGR content based on the complementary metadata. For example, if the first segment metadata indicates a first meaning of "red" and the second segment metadata indicates a second meaning of "color", the device generates CGR content associated with red, green, blue, etc., with red, optionally, emphasized. As another example, if the first segment metadata indicates a first meaning of "dog" and the second segment metadata indicates a second meaning of "animal", the device generates CGR content associated with many different animals in the background and a dog in the foreground (e.g., emphasized). Accordingly, in various implementations, the CGR content includes a plurality of CGR content with one emphasized.

In various implementations, the relationship is a contrasting relationship and the device generates CGR content based on the contrasting metadata. For example, in FIG. 8D, in response to the fourth segment of the third audio file and the fourth segment of the fourth audio file having contrasting semantic content (e.g., one fourth segment include lyrics having a meaning of "fire" and the other fourth segment includes lyrics having a meaning of "ice"), the fourth CGR environment 800 includes the virtual melting 842 on the table 412 illustrating fire melting a cube of ice, with steam therebetween. Accordingly, in various implementations, the CGR content includes two opposite CGR content (one based on the first segment metadata and the other based on the second metadata) interacting.

In various implementations, the method 1000 optionally includes, in block 1070, concurrently: (1) playing, via a speaker, the one of the first segments, (2) playing, via the speaker, the one of the second segments, and (3) displaying, on a display, the CGR content. In various implementations, playing the one of the first segments and/or playing the one of the second segments includes altering the one of the first segments and/or the one of the second segments such as adjusting a pitch and/or speed of the segment to better match the other. Thus, in various implementations, the one of the first segments and/or the one of the second segments is processed or modified to reduce discordance between the one of the first segments and the one of the second segments. For example, in various implementations, the key and/or tempo of the one of the first segments and/or the one of the second segments is changed to better match that of the other segment.

In various implementations, concurrently playing the one of the first segments and the one of the second segments includes cross-fading from the one of the first segments to the one of the second segments. In various implementations, cross-fading including concurrently playing the one of the first segments and the one of the second segments while decreasing the volume of the one of the first segments and increasing the volume of the one of the second segments.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including a processor, non-transitory memory, a speaker, and a display:
   obtaining a first audio file and a second audio file;
   parsing the first audio file into a plurality of first segments;
   parsing the second audio file into a plurality of second segments;
   generating, for each of the plurality of first segments and each of the plurality of second segments, segment metadata;
   determining a relationship between first segment metadata of one of the plurality of first segments and second segment metadata of one of the plurality of second segments;
   generating computer-generated reality (CGR) content associated with the one of the plurality of first segments and the one of the plurality of second segments based on the relationship, the first segment metadata, and the second segment metadata; and
   displaying the CGR content on the display by overlaying a virtual object onto a pass-through representation of a physical environment of the electronic device when the electronic device is concurrently playing the one of the plurality of first segments and the one of the plurality of second segments via the speaker.

2. The method of claim 1, wherein parsing the first audio file into the plurality of first segments includes parsing the first audio file into a plurality of segments, each segment indicating a line of lyrics.

3. The method of claim 1, wherein the first segment metadata indicates a tempo or a key of the one of the plurality of first segments.

4. The method of claim 1, wherein the first segment metadata indicates a mood of the one of the plurality of first segments.

5. The method of claim 1, wherein the first segment metadata indicates a meaning of the one of the plurality of first segments derived by semantic analysis of audio data and lyric data of the one of the plurality of first segments.

6. The method of claim 1, wherein determining the relationship includes determining a matching relationship between the first segment metadata and the second segment metadata.

7. The method of claim 6, wherein generating the CGR content is based on matched metadata of the first segment metadata and the second segment metadata.

8. The method of claim 1, wherein determining the relationship includes determining a complementary relationship between the first segment metadata and the second segment metadata.

9. The method of claim 8, wherein generating the CGR content is based on complementary metadata of the first segment metadata and the second segment metadata and the CGR content includes a plurality of CGR content with one emphasized.

10. The method of claim 1, wherein determining the relationship includes determining a contrasting relationship between the first segment metadata and the second segment metadata.

11. The method of claim 10, wherein generating the CGR content is based on contrasting metadata of the first segment metadata and the second segment metadata and the CGR content includes two opposite CGR content interacting.

12. The method of claim 1, further comprising concurrently:
    playing, via the speaker, the one of the plurality of first segments;
    playing, via the speaker, the one of the plurality of second segments; and
    displaying, on the display, the CGR content.

13. The method of claim 12, wherein playing the one of the plurality of first segments includes adjusting a key and/or tempo of the one of the plurality of first segments to better match the one of the plurality of second segments.

14. A device comprising:
    one or more processors;
    a non-transitory memory;
    a speaker;
    a display; and
    one or more programs stored in the non-transitory memory, which, when executed by the one or more processors, cause the device to:
    obtain a first audio file and a second audio file;
    parse the first audio file into a plurality of first segments;
    parse the second audio file into a plurality of second segments;
    generate, for each of the plurality of first segments and each of the plurality of second segments, segment metadata;

determine a relationship between first segment metadata of one of the plurality of first segments and second segment metadata of one of the plurality of second segments;

generate computer-generated reality (CGR) content associated with the one of the plurality of first segments and the one of the plurality of second segments based on the relationship, the first segment metadata, and the second segment metadata; and display the CGR content on the display by overlaying a virtual object onto a pass-through representation of a physical environment of the device when the device is concurrently playing the one of the plurality of first segments and the one of the plurality of second segments via the speaker.

15. The device of claim 14, wherein determining the relationship includes determining a matching relationship between the first segment metadata and the second segment metadata.

16. The device of claim 15, wherein generating the CGR content is based on matched metadata of the first segment metadata and the second segment metadata.

17. The device of claim 14, wherein determining the relationship includes determining a complementary relationship between the first segment metadata and the second segment metadata.

18. The device of claim 17, wherein generating the CGR content is based on complementary metadata of the first segment metadata and the second segment metadata and the CGR content includes a plurality of CGR content with one emphasized.

19. The device of claim 14, wherein determining the relationship includes determining a contrasting relationship between the first segment metadata and the second segment metadata.

20. The device of claim 19, wherein generating the CGR content is based on contrasting metadata of the first segment metadata and the second segment metadata and the CGR content includes two opposite CGR content interacting.

21. A non-transitory memory storing one or more programs, which, when executed by one or more processors of a device with a speaker and a display, cause the device to:
obtain a first audio file and a second audio file;
parse the first audio file into a plurality of first segments;
parse the second audio file into a plurality of second segments;

generate, for each of the plurality of first segments and each of the plurality of second segments, segment metadata;

determine a relationship between first segment metadata of one of the plurality of first segments and second segment metadata of one of the plurality of second segments;

generate computer-generated reality (CGR) content associated with the one of the plurality of first segments and the one of the plurality of second segments based on the relationship, the first segment metadata, and the second segment metadata; and display the CGR content on the display by overlaying a virtual object onto a pass-through representation of a physical environment of the device when the device concurrently plays the one of the plurality of first segments and the one of the plurality of second segments via the speaker.

22. The non-transitory memory of claim 21, wherein determining the relationship includes determining a matching relationship between the first segment metadata and the second segment metadata.

23. The non-transitory memory of claim 22, wherein generating the CGR content is based on matched metadata of the first segment metadata and the second segment metadata.

24. The non-transitory memory of claim 21, wherein determining the relationship includes determining a complementary relationship between the first segment metadata and the second segment metadata.

25. The non-transitory memory of claim 24, wherein generating the CGR content is based on complementary metadata of the first segment metadata and the second segment metadata and the CGR content includes a plurality of CGR content with one emphasized.

26. The non-transitory memory of claim 21, wherein determining the relationship includes determining a contrasting relationship between the first segment metadata and the second segment metadata.

27. The non-transitory memory of claim 26, wherein generating the CGR content is based on contrasting metadata of the first segment metadata and the second segment metadata and the CGR content includes two opposite CGR content interacting.

* * * * *